US011934124B2

(12) United States Patent
Inomata

(10) Patent No.: US 11,934,124 B2
(45) Date of Patent: Mar. 19, 2024

(54) HEATING DEVICE

(71) Applicant: TOSHIBA TEC KABUSHIKI KAISHA, Tokyo (JP)

(72) Inventor: Toshiya Inomata, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/859,433

(22) Filed: Jul. 7, 2022

(65) Prior Publication Data

US 2023/0152737 A1 May 18, 2023

(30) Foreign Application Priority Data

Nov. 12, 2021 (JP) ................................. 2021-184695

(51) Int. Cl.
*G03G 15/20* (2006.01)

(52) U.S. Cl.
CPC ................................ *G03G 15/2053* (2013.01)

(58) Field of Classification Search
CPC ........... G03G 15/2017; G03G 15/2039; G03G 15/2042; G03G 15/2053; G03G 2215/2003
See application file for complete search history.

(56) References Cited

U.S. PATENT DOCUMENTS 6,455,811 B2 9/2002 Otsuka
10,303,097 B2 5/2019 Nakashima et al.
2013/0302060 A1* 11/2013 Moriya .................. G03G 15/80 399/90
2021/0063927 A1* 3/2021 Kikuchi ............. G03G 15/2039
2021/0141324 A1 5/2021 Endo

FOREIGN PATENT DOCUMENTS

JP 2000-131982 A 5/2000
JP 2002-075597 A 3/2002
JP 2008-181682 A 8/2008
JP 2013-242468 A 12/2013

OTHER PUBLICATIONS

Extended European Search Report dated Mar. 24, 2023 issued in European Patent Application No. 22195570.1, 8 pages.

* cited by examiner

*Primary Examiner* — Thomas S Giampaolo, II
(74) *Attorney, Agent, or Firm* — FOLEY & LARDNER LLP

(57) ABSTRACT

A heater assembly includes a tubular body, a heater, and a support member. The tubular body is formed in a tubular shape and has a length that extends longitudinally. The heater is received within the tubular body. The heater provides thermal energy in response to being electrically energized. The heater includes a first surface side extending laterally and longitudinally along an inner peripheral surface of the tubular body. The heater includes n electrical contact, through which electrical energy is supplied to the heater. The support member is coupled to the heater and extends longitudinally. The support member defines an opening that exposes the electrical contact. The support member is configured to bend to facilitate coupling the heater to the support member.

16 Claims, 21 Drawing Sheets

38

HEATING DEVICE

CROSS-REFERENCE TO RELATED APPLICATION

This application is based upon and claims the benefit of priority from Japanese Patent Application No. 2021-184695, filed on Nov. 12, 2021, the entire contents of which are incorporated herein by reference.

FIELD

Embodiments described herein relate to a heating device.

BACKGROUND

A heating device includes a tubular body, a heater, a power supply unit, and a support member. The tubular body is formed in a tubular shape. The heater is disposed inside the tubular body. The heater has an axial direction of the tubular body as a longitudinal direction. The heater has its first surface side being in contact with an inner peripheral surface of the tubular body. The heater generates heat by energization. The power supply unit supplies power to the heater. The support member supports the heater. The tubular body slides on the first surface of the heater. In order to prevent wear and damage to the first surface of the heater, a disposition of the heater may be changed with respect to the tubular body. When the disposition of the heater is changed, disposition of the power supply unit may also be changed. Depending upon the disposition of the heater and the power supply unit, the support member may be complicated.

DETAILED DESCRIPTION

In general, according to one embodiment, a heating device capable of preventing complication of a support member is provided.

A heater assembly according to an embodiment includes a tubular body, a heater, and a support member. The tubular body is formed in a tubular shape and has a length that extends longitudinally. The heater is received within the tubular body. The heater provides thermal energy in response to being electrically energized. The heater includes a first surface side extending laterally and longitudinally along an inner peripheral surface of the tubular body. The heater includes n electrical contact, through which electrical energy is supplied to the heater. The support member is coupled to the heater and extends longitudinally. The support member defines an opening that exposes the electrical contact. The support member is configured to bend to facilitate coupling the heater to the support member.

Figure 1:
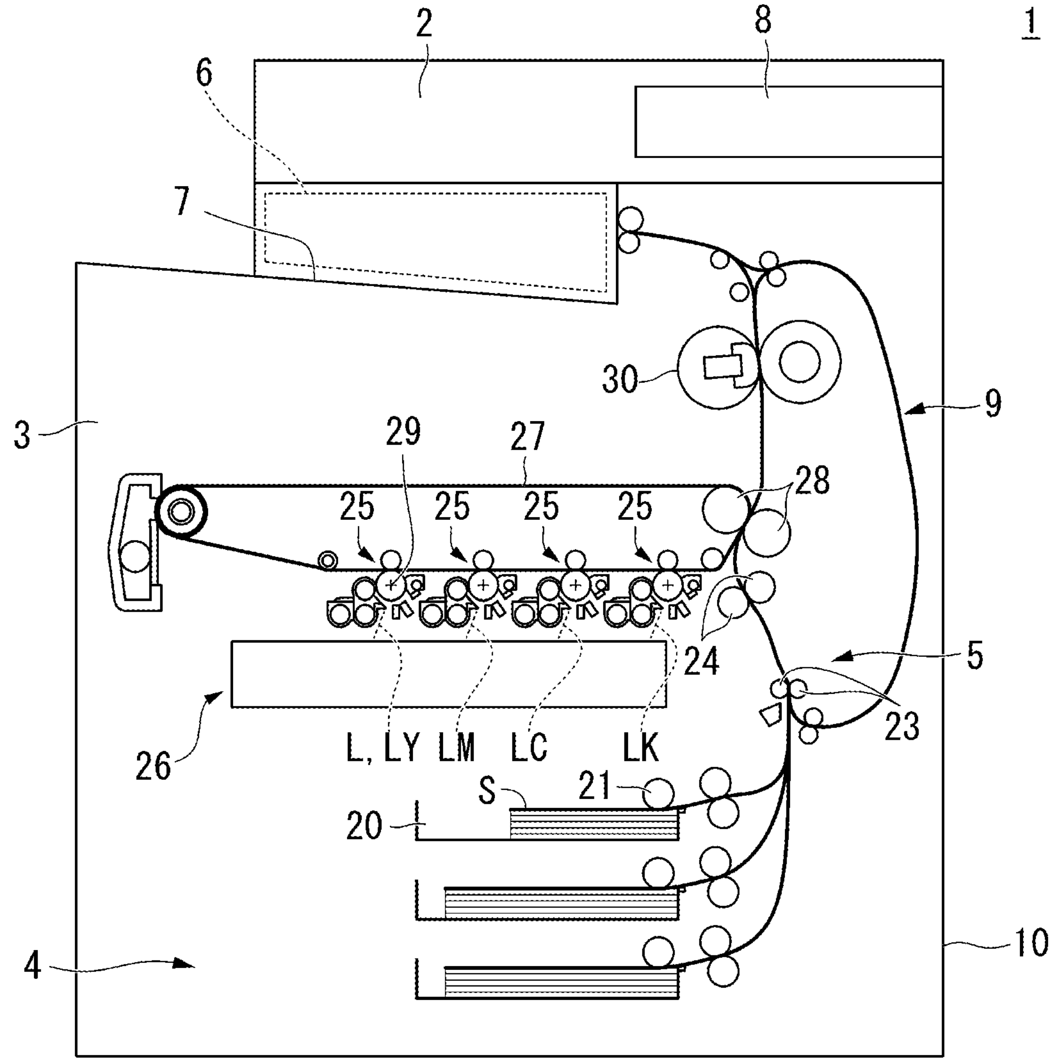
FIG. 1 is a schematic configuration diagram of an image forming apparatus according to an embodiment.

Hereinafter, a heating device (e.g., a heater assembly) according to an embodiment will be described with reference to the drawings. FIG. 1 is a schematic diagram of an image forming apparatus according to the embodiment. As illustrated in FIG. 1, an image forming apparatus 1 includes a housing 10, a scanner unit 2 (e.g., a scanner), an image forming unit 3 (e.g., a printer), a sheet supply unit 4, a conveying unit 5 (e.g., a conveyor), a sheet discharge tray 7, a reversing unit 9, a control panel 8 (e.g., a user interface), and a control unit 6 (e.g., a controller). The image forming apparatus 1 forms an image on a sheet-shaped recording medium (hereinafter, referred to as a “sheet”) such as a piece of paper.

The housing 10 forms an outer shape of the image forming apparatus 1. The housing 10 accommodates components of the image forming apparatus 1. The scanner unit 2 reads image information of an object to be copied based on brightness and darkness of light, and generates an image signal. The scanner unit 2 outputs the generated image signal to the image forming unit 3.

The image forming unit 3 forms an output image by a recording material such as a toner based on an image signal received from the scanner unit 2 or an image signal received from the outside. Hereinafter, the output image is referred to as a toner image. The image forming unit 3 transfers the toner image to a surface of a sheet S. The image forming unit 3 applies heat and pressure to the toner image on the surface of the sheet S to fix the toner image on the sheet S. The image forming unit 3 forms an image on the sheet S.

The sheet supply unit 4 supplies sheets S one by one to the conveying unit 5 according to a timing when the image forming unit 3 forms the toner image. The sheet supply unit 4 includes a sheet accommodation unit 20 (e.g., a tray) and a pickup roller 21. The sheet accommodation unit 20 stores sheets S of a predetermined size and a predetermined type. The pickup roller 21 takes out the sheets S one by one from the sheet accommodation unit 20. The pickup roller 21 supplies the taken-out sheets S to the conveying unit 5.

The conveying unit 5 conveys the sheet S supplied from the sheet supply unit 4 to the image forming unit 3. The conveying unit 5 includes conveying rollers 23 and registration rollers 24. The conveying rollers 23 convey the sheet S supplied from the pickup roller 21 to the registration rollers 24. The conveying rollers 23 abut a tip of the sheet S in a conveying direction against nips of the registration rollers 24. The registration rollers 24 adjust a position of the tip of the sheet S in the conveying direction by bending the sheet S at the nip. The registration rollers 24 convey the sheet S according to a timing when the image forming unit 3 transfers the toner image to the sheet S.

The image forming unit 3 will be described. The image forming unit 3 includes a plurality of image forming portions 25, a laser scanning unit 26, an intermediate transfer belt 27, a transfer unit 28, and a heating device 30 (e.g., a heater assembly). Each image forming portion 25 includes a photoreceptor drum 29 (e.g., a photosensitive element). The image forming portion 25 forms, on the photoreceptor drum 29, a toner image corresponding to the image signal from the scanner unit 2 or the outside. The plurality of image forming portions 25 form toner images using a yellow toner, a magenta toner, a cyan toner, and a black toner, respectively.

A charger, a developing device, and the like are disposed around the photoreceptor drum 29. The charger charges a surface of the photoreceptor drum 29. The developing device accommodates a developer including a yellow toner, a magenta toner, a cyan toner, and a black toner. The developing device develops an electrostatic latent image on the photoreceptor drum 29. As a result, a toner image using a toner of each color is formed on the photoreceptor drum 29.

The laser scanning unit 26 scans the charged photoreceptor drum 29 with a series of laser beams L to expose the photoreceptor drum 29. The laser scanning unit 26 exposes colors on the photoreceptor drums 29 of the image forming portions 25 with different laser beams LY, LM, LC, and LK, respectively. Accordingly, the laser scanning unit 26 forms an electrostatic latent image on the photoreceptor drums 29.

The toner image formed on the surface of the photoreceptor drum 29 is primarily transferred to the intermediate transfer belt 27. The transfer unit 28 transfers, to the surface of the sheet S at a secondary transfer position, the toner image primarily transferred to the intermediate transfer belt 27. The heating device 30 applies heat and pressure to the toner image transferred to the sheet S to fix the toner image to the sheet S. The heating device 30 functions as a fixing device (e.g., a fixer) that fixes the toner image to the sheet S.

The reversing unit 9 reverses the sheet S in order to form an image on a back surface of the sheet S. The reversing unit 9 reverses front and back surfaces of the sheet S discharged from the heating device 30 by switchback. The reversing unit 9 conveys the reversed sheet S toward the registration rollers 24. The sheet discharge tray 7 is loaded with the discharged sheet S on which the image is formed. The control panel 8 is a part of an input unit that inputs information for an operator to operate the image forming apparatus 1. The control panel 8 includes a touch panel and various hard keys. The control panel 8 may provide information to the operator (e.g., through representation on the touch panel). The control unit 6 controls each unit of the image forming apparatus 1.

Figure 2:
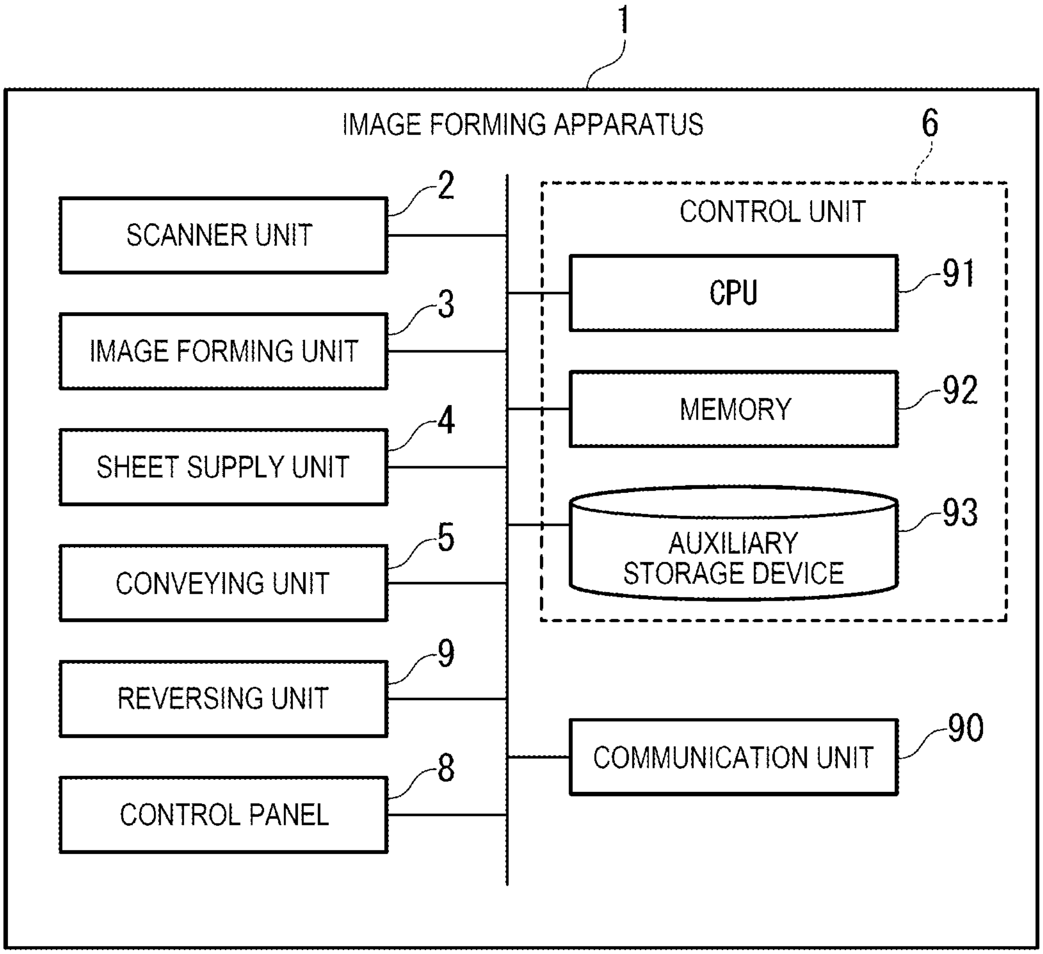
FIG. 2 is a hardware configuration diagram of the image forming apparatus.

FIG. 2 is a hardware configuration diagram of the image forming apparatus 1 according to the embodiment. The image forming apparatus 1 includes a central processing unit (CPU) 91 (e.g., a processor), a memory 92, an auxiliary storage device 93, and the like. The CPU 91, the memory 92, the auxiliary storage device 93, and the like are connected by a bus, respectively. The image forming apparatus 1 executes various programs. The image forming apparatus 1 functions as an apparatus including the scanner unit 2, the image forming unit 3, the sheet supply unit 4, the conveying unit 5, the reversing unit 9, the control panel 8, and a communication unit 90 by executing the programs.

The CPU 91 functions as the control unit 6 by executing programs stored in the memory 92 and the auxiliary storage device 93. The control unit 6 controls operation of each functional unit of the image forming apparatus 1. The auxiliary storage device 93 is formed by using a storage device such as a magnetic hard disk device or a semiconductor storage device. The auxiliary storage device 93 stores information. The communication unit 90 includes a communication interface (e.g., a network interface) for connecting an own device to an external device. The communication unit 90 communicates with the external device via the communication interface.

Figure 3:
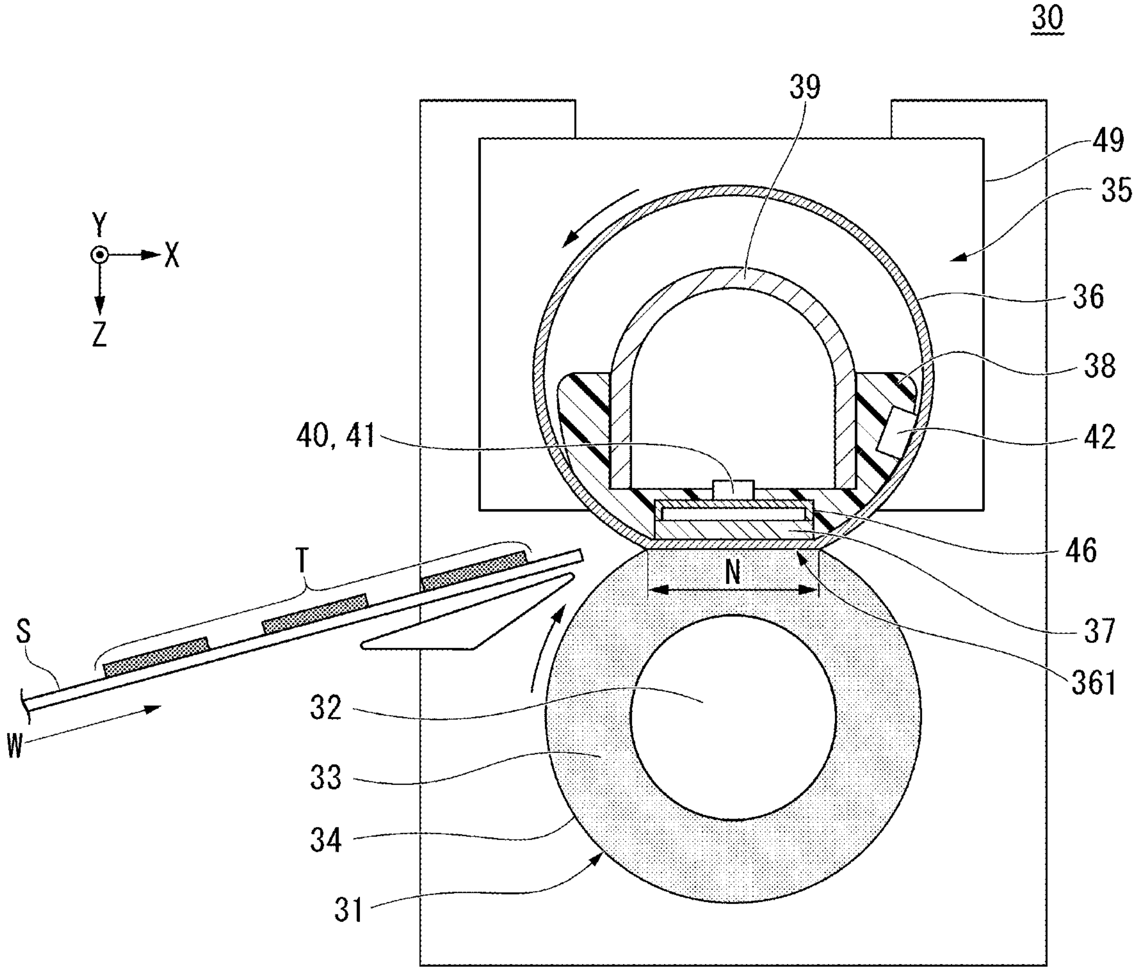
FIG. 3 is an XZ cross-sectional view of a heating device.

The heating device 30 will be described in detail. FIG. 3 is an XZ cross-sectional view of the heating device 30 according to the embodiment. As illustrated in FIG. 3, the heating device 30 includes a pressure roller 31 and a heating mechanism 35 (e.g., a heater).

The pressure roller 31 forms a nip N with the heating mechanism 35. The pressure roller 31 applies pressure to a toner image T on a sheet S that entered the nip N. The pressure roller 31 rotates on its axis to convey the sheet S. The pressure roller 31 includes a core metal 32 (e.g., a metallic core), an elastic layer 33 (e.g., a middle layer), and a release layer 34 (e.g., an outer layer).

The core metal 32 is formed in a cylindrical, columnar shape by a metal material such as stainless steel. Both end portions of the core metal 32 in an axial direction are rotatably supported. The core metal 32 is rotationally driven by a motor (e.g., an electric motor). The core metal 32 is in contact with a cam member. The cam member enables the core metal 32 to move toward and away from the heating mechanism 35 by rotating.

The elastic layer 33 is formed of an elastic material (e.g., a resilient material) such as silicone rubber. The elastic layer 33 is formed on an outer peripheral surface of the core metal 32 with a constant thickness. The release layer 34 is formed of a resin material such as tetrafluoroethylene or perfluoroalkyl vinyl ether copolymer (PFA). The release layer 34 is formed on an outer peripheral surface of the elastic layer 33.

A hardness of an outer peripheral surface of the pressure roller 31 is preferably 40° to 70° under a load of 9.8 N as measured by an ASKER-C hardness meter. Accordingly, an area of the nip N is ensured. Moreover, durability of the pressure roller 31 is ensured.

The pressure roller 31 can move toward and away from the heating mechanism 35 by rotation of the cam member. When the pressure roller 31 moves toward the heating mechanism 35 and is pressed by a pressure spring, the nip N is formed. On the other hand, when jam of the sheet S occurs in the heating device 30, the sheet S can be removed by moving the pressure roller 31 away from the heating mechanism 35. In a state in which a tubular body 36 stops rotating, such as during sleep, plastic deformation of the tubular body 36 is prevented by moving the pressure roller 31 away from the heating mechanism 35.

The pressure roller 31 is rotationally driven by the motor and rotates about its axis (e.g., a central longitudinal axis of rotation). When the pressure roller 31 rotates about its axis in a state in which the nip N is formed, the tubular body 36 of the heating mechanism 35 is driven to rotate. The pressure roller 31 rotates about its axis in a state in which the sheet S is disposed on the nip N, thereby conveying the sheet S in a conveying direction W.

The heating mechanism 35 applies heat to the toner image T on the sheet S that entered the nip N. The heating mechanism 35 includes the tubular body 36, a heater 37, a heat equalizing member 46, a support member 38, a stay 39, a thermostat unit 40 (e.g., a thermostat), a first temperature detection member 41 (e.g., a first temperature sensor), and a second temperature detection member 42 (e.g., a second temperature sensor).

Hereinafter, an XYZ coordinate system may be used to describe a configuration of the heating device 30. In the embodiment, an X direction, a Y direction, and a Z direction are defined as follows. The X direction corresponds to a direction along a lateral direction of the heater 37. The Y direction corresponds to a direction along a longitudinal direction of the heater 37 (e.g., an axial direction of the tubular body, along a length of the tubular body). In the present embodiment, the Y direction is orthogonal to the conveying direction W of the sheet S. The Z direction corresponds to a direction orthogonal to the X direction and the Y direction (e.g., a vertical direction or orthogonal direction). Hereinafter, in the X direction, one side is referred to as +X side and the other side is referred to as −X side. In the Y direction, one side is referred to as +Y side, and the other side is referred to as −Y side. In the Z direction, one side is referred to as +Z side, and the other side is referred to as −Z side.

The tubular body 36 is formed in a tubular shape by a film or the like. The tubular body 36 has an endless (e.g., continuous) peripheral surface. The tubular body 36 is flexible. The tubular body 36 forms the nip N between the tubular body 36 and the pressure roller 31. The tubular body 36 fixes, at the nip N, the toner image T on the sheet S. The tubular body 36 is an endless belt (e.g., a fixing belt) of the heating device 30.

The tubular body 36 includes a base layer, an elastic layer, and a release layer in this order from an inner peripheral side (e.g., the base layer is the innermost layer). The base layer is formed of a material such as polyimide resin. The base layer is in a tubular shape extending in the Y direction. The elastic layer is laminated and disposed on an outer peripheral surface of the base layer. The elastic layer is formed of an elastic material such as silicone rubber. The release layer is laminated and disposed on an outer peripheral surface of the elastic layer. The release layer is formed of a material such as PFA resin.

The heater 37 is disposed inside the tubular body 36. The heater 37 faces a heated region 361, which is a part of the tubular body 36 in a circumferential direction. The heater 37 heats the heated region 361. The heater 37 is disposed inside a portion where the tubular body 36 faces the pressure roller 31 so as to face the nip N.

A lubricant is applied to an inner peripheral surface of the tubular body 36. The heater 37 is in contact with the inner peripheral surface of the tubular body 36 through the lubricant. When the heater 37 generates heat, a viscosity of the lubricant decreases. Accordingly, slidability between the heater 37 and the tubular body 36 is ensured. The tubular body 36 slides on a surface (a +Z side surface) of the heater 37 while being in contact with the heater 37 on one surface.

The heat equalizing member 46 (e.g., a heat spreader) is formed of a metal material such as copper or aluminum. Thermal conductivity of the heat equalizing member 46 is higher than thermal conductivity of a substrate 50 of the heater 37. A length of the heat equalizing member 46 in the X direction is equal to a length of the substrate 50 of the heater 37 in the X direction. A length of the heat equalizing member 46 in the Y direction is shorter than a length of the substrate 50 of the heater 37 in the Y direction. The heat equalizing member 46 is disposed in contact with the −Z side surface of the heater 37. The heat equalizing member 46 averages a temperature distribution of the heater 37.

The support member 38 (e.g., a support) is formed of a resin material such as a liquid crystal polymer. The support member 38 is disposed so as to cover −Z side and both sides in the X direction of the heat equalizing member 46. The support member 38 supports the heater 37 through the heat equalizing member 46. Round chamfers are formed at both end portions of the support member 38 in the X direction. The support member 38 supports the inner peripheral surface of the tubular body 36 at both end portions of the heater 37 in the X direction.

The stay 39 (e.g., a frame, a chassis, etc.) is formed of a steel plate material or the like. A cross section of the stay 39 along an XZ plane is formed in a U shape. The stay 39 is mounted on the −Z side of the support member 38 such that a U-shaped opening portion is blocked by the support member 38. The stay 39 extends in the Y direction. Both end portions of the stay 39 in the Y direction are fixed to the housing 10 of the image forming apparatus 1. Therefore, the heating mechanism 35 is supported by the image forming apparatus 1. The stay 39 improves (e.g., increases) bending rigidity of the heating mechanism 35. Flanges 49 that restrict movement of the tubular body 36 in the Y direction are mounted near both end portions of the stay 39 in the Y direction.

Figure 4:
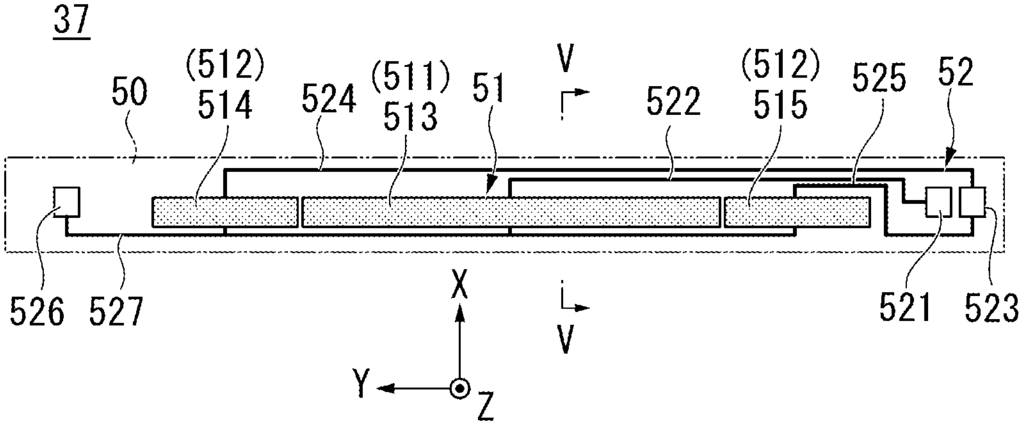
FIG. 4 is a plan view of a heater.
Figure 5:
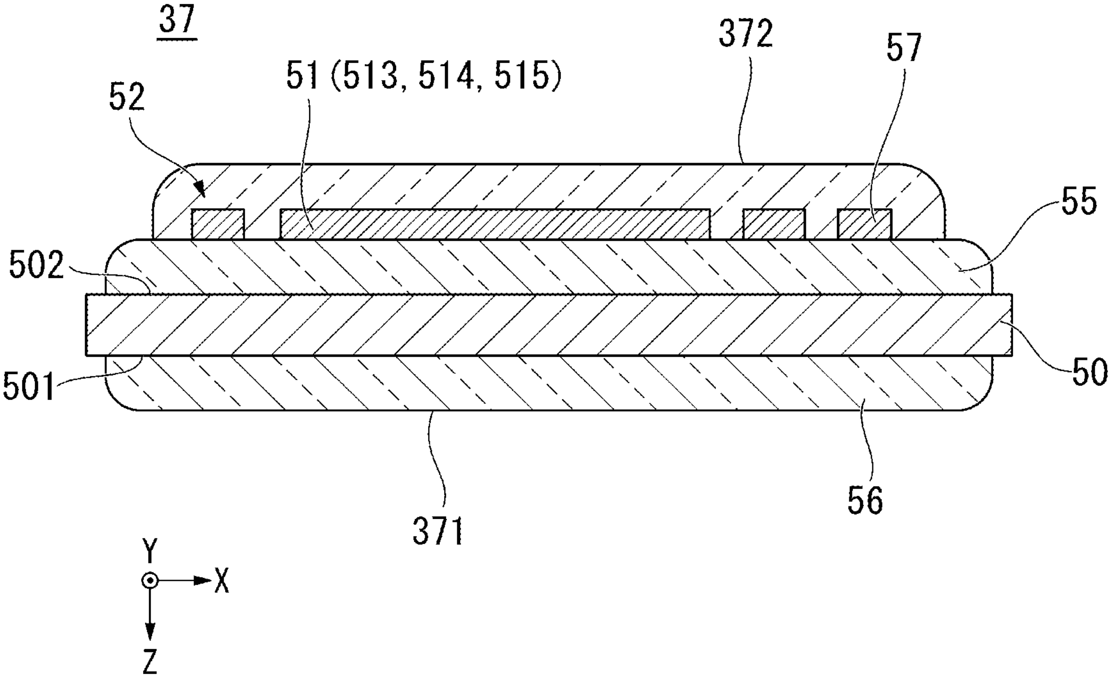
FIG. 5 is a cross-sectional view taken along a line V-V in FIG. 4.

FIG. 4 is a plan view of the heater 37 according to the embodiment. FIG. 5 is a cross-sectional view taken along a line V-V in FIG. 4. As illustrated in FIG. 4, the heater 37 includes the substrate 50, a heat generating member 51, and a wiring set 52 (e.g., a wiring harness). In FIG. 4, the substrate 50 is indicated by a two-dot chain line.

The substrate 50 is formed of a metal material such as stainless steel or a ceramic material such as aluminum nitride. The substrate 50 is formed in a rectangular plate shape along the Y direction. The substrate 50 is disposed on an inner side (the −Z side) of the tubular body 36 in a radial direction. The substrate 50 has the axial direction of the tubular body 36 as a longitudinal direction.

As illustrated in FIG. 5, the substrate 50 has a first surface 501 and a second surface 502 facing opposite directions to each other. The first surface 501 (e.g., a bottom surface) is a surface facing the +Z side. The second surface 502 (e.g., a top surface) is a surface facing the −Z side. A first protective layer 56 made of a glass material or the like is formed on the first surface 501 of the substrate 50. In the heater 37 according to the embodiment, the first surface 501 side of the substrate 50 is in contact with the inner peripheral surface of the tubular body 36. The first protective layer 56 has a surface facing the +Z side. The surface of the first protective layer 56 is a surface on a side where the heater 37 is in contact with the inner peripheral surface of the tubular body 36. The surface of the first protective layer 56 corresponds to a first surface 371 of the heater 37.

An insulating layer 55 made of a glass material or the like is formed on the second surface 502 of the substrate 50. The heat generating member 51 and the wiring set 52 are disposed on the substrate 50 through the insulating layer 55 (e.g., the insulating layer 55 extends between (a) the heat generating member 51 and the wiring set 52 and (b) the substrate 50). The heat generating member 51 and the wiring set 52 are provided on a −Z side surface of the insulating layer 55. The heat generating member 51 and the wiring set 52 are covered with a second protective layer 57 made of a glass material or the like. The second protective layer 57 has a surface facing the −Z side. The surface of the second protective layer 57 corresponds to a second surface 372 opposite to the first surface 371 of the heater 37.

As illustrated in FIG. 4, the heat generating member 51 includes a first heat generating portion 511 and second heat generating portions 512. The first heat generating portion 511 and the second heat generating portions 512 are formed of a temperature coefficient of resistance (TCR) material. For example, the first heat generating portion 511 and the second heat generating portions 512 are formed of a silver-palladium alloy or the like.

The first heat generating portion 511 according to the embodiment includes a central heating element 513. The central heating element 513 is disposed at a central portion of the substrate 50 in the longitudinal direction (the Y direction). An outer shape of the central heating element 513 is a rectangular shape having long sides along the Y direction and short sides along the X direction. The central heating element 513 is disposed along the longitudinal direction of the substrate 50.

The second heat generating portions 512 according to the embodiment respectively include a first end portion heating element 514 and a second end portion heating element 515. The first end portion heating element 514 and the second end portion heating element 515 are disposed at end portions of the substrate 50 in the longitudinal direction (the Y direction). Outer shapes of the first end portion heating element 514 and the second end portion heating element 515 are each a rectangular shape having long sides along the Y direction and short sides along the X direction. Dimensions of the first end portion heating element 514 and the second end portion heating element 515 in the Y direction are smaller than a dimension of the central heating element 513 in the Y direction. Dimensions of the first end portion heating element 514 and the second end portion heating element 515 in the X direction are equal to a dimension of the central heating element 513 in the X direction.

The first end portion heating element 514 is disposed on an end portion of the substrate 50 in the +Y side of the longitudinal direction (the Y direction). The second end portion heating element 515 is disposed on an end portion of the substrate 50 in the −Y side of the longitudinal direction (the Y direction). The first end portion heating element 514 is disposed on the +Y side with respect to the central heating element 513. The second end portion heating element 515 is disposed on the −Y side with respect to the central heating element 513. The first end portion heating element 514 and the second end portion heating element 515 are located on an outer side (the +Y side or the −Y side) of the substrate 50 in the longitudinal direction with respect to the central heating element 513.

The wiring set 52 is made of a metal material such as silver. The wiring set 52 includes a central contact 521, a central wiring 522, an end portion contact 523, a first end portion wiring 524, a second end portion wiring 525, a common contact 526, and a common wiring 527. The central contact 521, the end portion contact 523, and the common contact 526 correspond to power supply units (e.g., electrical contacts) that supply power to the heater 37.

The central contact 521 is disposed on the −Y side with respect to the heat generating member 51. The central contact 521 supplies electric power (i.e., electrical energy) to the central heating element 513 via the central wiring 522. The central wiring 522 is disposed on the +X side of the heat generating member 51. The central wiring 522 connects an end side of the central heating element 513 on the +X side to the central contact 521.

The end portion contact 523 is disposed on the −Y side with respect to the central contact 521. The end portion contact 523 supplies electric power to the end portion heating elements 514 and 515 via the end portion wirings 524 and 525. The first end portion wiring 524 is disposed on the +X side of the central wiring 522, which is the +X side of the heat generating member 51. The first end portion wiring 524 connects an end side of the first end portion heating element 514 on the +X side to an end portion of the end portion contact 523 on the +X side. The second end portion wiring 525 is disposed on the +X side of the heat generating member 51, which is the −X side of the central wiring 522. The second end portion wiring 525 connects an end side of the second end portion heating element 515 on the +X side to an end portion of the end portion contact 523 on the −X side.

The common contact 526 is disposed on the +Y side with respect to the heat generating member 51. The common wiring 527 is disposed on the −X side of the heat generating member 51. The common wiring 527 connects end sides of the central heating element 513, the first end portion heating element 514, and the second end portion heating element 515 on the −X side to the common contact 526.

In the present embodiment, the heat generating member 51 generates heat by energization (e.g., when electrically energized through a resistive heating process in which the application of electrical energy causes the heating elements to generate or provide thermal energy). An electric resistance value of the central heating element 513 is smaller than electric resistance values of the first end portion heating element 514 and the second end portion heating element 515. In the present embodiment, a narrow sheet having a width in the Y direction smaller than a predetermined width passes through a central portion of the heating device 30 in the Y direction. In this case, the control unit 6 causes only the central heating element 513 to generate heat. On the other hand, when a wide sheet having a width in the Y direction larger than the predetermined width is used, the control unit 6 causes the entire heat generating member 51 to generate heat. That is, when the wide sheet is used, the control unit 6 causes the central heating element 513, the first end portion heating element 514, and the second end portion heating element 515 to generate heat. In the present embodiment, heat generation of the central heating element 513, the first end portion heating element 514, and the second end portion heating element 515 can be controlled independently of each other. In the present embodiment, the heat generation of the first end portion heating element 514 and the second end portion heating element 515 is controlled in the same manner.

As illustrated in FIG. 3, the thermostat unit 40 and the first temperature detection member 41 are disposed on the −Z side of the heater 37 with the heat equalizing member 46 interposed therebetween. For example, the first temperature detection member 41 is a thermistor. The thermostat unit 40 and the first temperature detection member 41 are mounted and supported on a −Z side surface of the support member 38. Temperature sensing elements of the thermostat unit 40 and the first temperature detection member 41 are in contact with the heat equalizing member 46 through a hole or passage penetrating the support member 38 in the Z direction. The thermostat unit 40 and the first temperature detection member 41 measure a temperature of the heater 37 via the heat equalizing member 46.

Figure 6:
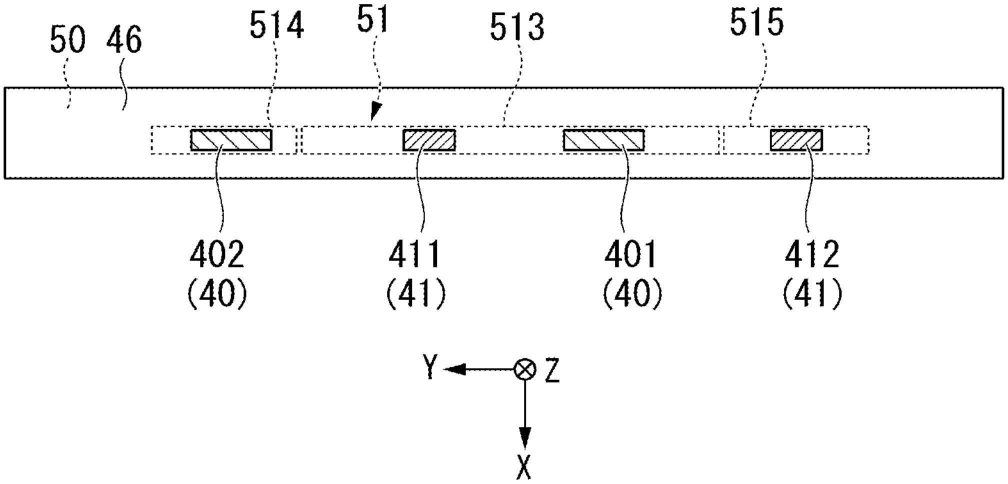
FIG. 6 is a diagram illustrating disposition of a thermostat unit and a first temperature detection unit.

FIG. 6 is a diagram illustrating disposition of the thermostat unit 40 and the first temperature detection unit 41. FIG. 6 corresponds to a plan view of the thermostat unit 40 and the first temperature detection unit 41 as viewed from the −Z side. In FIG. 6, illustration of the support member 38 is omitted. The following descriptions regarding the disposition of the thermostat unit 40 and the first temperature detection unit 41 are descriptions of disposition of the respective temperature sensing elements.

As illustrated in FIG. 6, the first temperature detection member 41 includes a central heater thermometer 411 and an end portion heater thermometer 412. The central heater thermometer 411 and the end portion heater thermometer 412 are disposed apart from each other in the Y direction. The central heater thermometer 411 and the end portion heater thermometer 412 are disposed within a range of the heat generating member 51 in the Y direction. The central heater thermometer 411 and the end portion heater thermometer 412 are disposed at the center of the heat generating member 51 in the X direction. As viewed from the Z direction, the central heater thermometer 411 and the end portion heater thermometer 412 overlap with at least a part of the heat generating member 51.

The central heater thermometer 411 measures a temperature of the central heating element 513. The central heater thermometer 411 is disposed within a range of the central heating element 513. As viewed from the Z direction, the central heater thermometer 411 overlaps with the central heating element 513.

The end portion heater thermometer 412 measures a temperature of the second end portion heating element 515. Since the heat generation of the first end portion heating element 514 and the second end portion heating element 515 is controlled in the same manner by the control unit 6, a temperature of the first end portion heating element 514 and a temperature of the second end portion heating element 515 are equal to each other. The end portion heater thermometer 412 is disposed within a range of the second end portion heating element 515. As viewed from the Z direction, the end portion heater thermometer 412 overlaps with the second end portion heating element 515. An end portion heater thermometer that measures the temperature of the first end portion heating element 514 may be provided separately from the end portion heater thermometer 412.

When a temperature of the heater 37 detected or sensed through the heat equalizing member 46 exceeds a predetermined temperature, the thermostat unit 40 cuts off energization of the heat generating member 51. The thermostat unit 40 includes a central thermostat 401 and an end portion thermostat 402. The thermostat unit 40 is also disposed in the same manner as the first temperature detection member 41 described above.

When the temperature of the central heating element 513 exceeds a predetermined temperature, the central thermostat 401 cuts off the energization of the heat generating member 51. The central thermostat 401 is disposed within the range of the central heating element 513. As viewed from the Z direction, the central thermostat 401 overlaps with the central heating element 513.

When the temperature of the first end portion heating element 514 exceeds a predetermined temperature, the end portion thermostat 402 cuts off the energization of the heat generating member 51. Since heat generation of the first end portion heating element 514 and the second end portion heating element 515 are controlled in the same manner, the temperature of the first end portion heating element 514 and the temperature of the second end portion heating element 515 are equal to each other. The end portion thermostat 402 is disposed within a range of the first end portion heating element 514. As viewed from the Z direction, the end portion thermostat 402 overlaps with the first end portion heating element 514.

In the heater 37 according to the present embodiment, the central heater thermometer 411 and the central thermostat 401 are disposed within the range of the central heating element 513, thereby controlling the temperature of the central heating element 513. In the heater 37 according to the present embodiment, the end portion thermostat 402 and the end portion heater thermometer 412 are disposed within the ranges of the first end portion heating element 514 and the second end portion heating element 515, respectively, thereby controlling the temperatures of the first end portion heating element 514 and the second end portion heating element 515.

As illustrated in FIG. 3, the second temperature detection member 42 is disposed on the +X side inside the tubular body 36. The second temperature detection member 42 measures a temperature of the tubular body 36 by being in contact with the inner peripheral surface of the tubular body 36. The second temperature detection member 42 corresponds to a belt thermometer that measures a temperature of the fixing belt serving as the tubular body 36.

Figure 7:
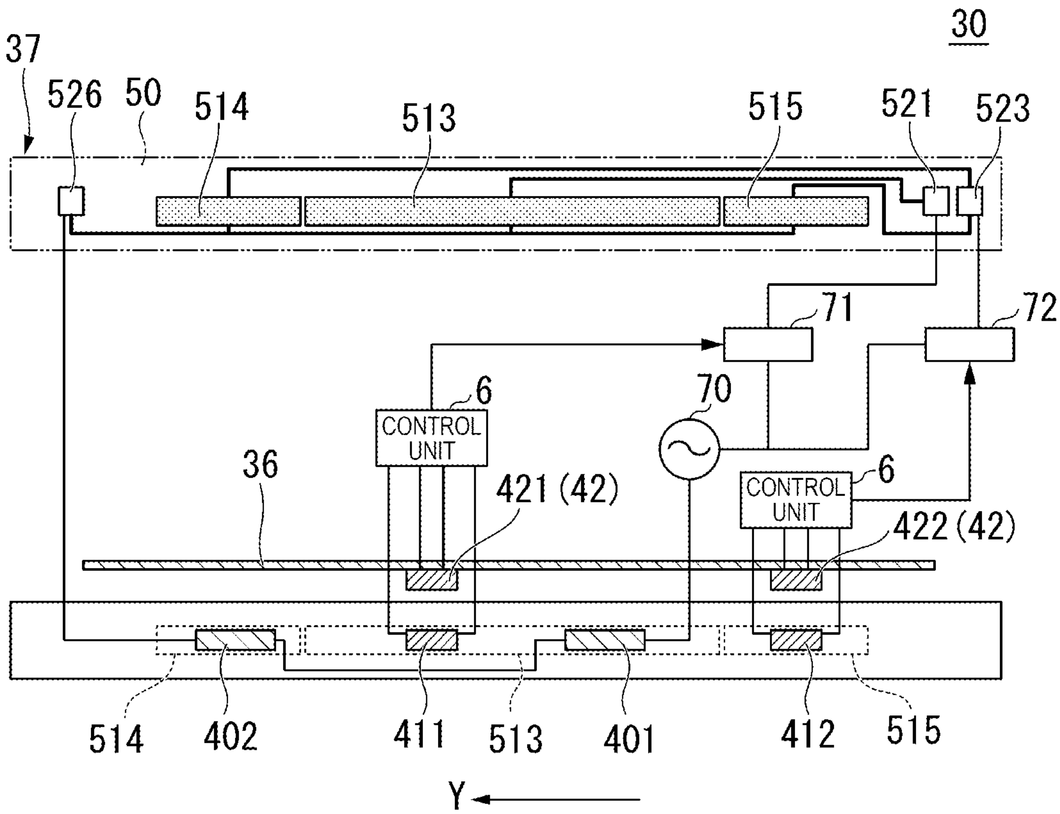
FIG. 7 is an electric circuit diagram of the heating device.

FIG. 7 is an electric circuit diagram of the heating device 30 according to the embodiment. In FIG. 7, the plan view illustrated in FIG. 6 is disposed on a lower side of a paper sheet, and the plan view illustrated in FIG. 4 is disposed on an upper side of the paper sheet. In addition, in FIG. 7, the second temperature detection member 42 is illustrated together with the cross section of the tubular body 36 in an upper side of the lower plan view. The second temperature detection member 42 includes a central belt thermometer 421 and an end portion belt thermometer 422.

The central belt thermometer 421 is in contact with a central portion of the tubular body 36 in the Y direction. The central belt thermometer 421 is in contact with the tubular body 36 within a range of the central heating element 513 in the Y direction. The central belt thermometer 421 measures a temperature of the central portion of the tubular body 36 in the Y direction.

The end portion belt thermometer 422 is in contact with an end portion of the tubular body 36 on the −Y side. The end portion belt thermometer 422 is in contact with the tubular body 36 within a range of the second end portion heating element 515 in the Y direction. The end belt thermometer 422 measures a temperature of the end portion of the tubular body 36 on the −Y side. As described above, the heat generation of the first end portion heating element 514 and the second end portion heating element 515 are controlled in the same manner. In the present embodiment, the temperature of the end portion on the −Y side and the temperature of the end portion on the +Y side of the tubular body 36 are equal to each other.

A power supply 70 (e.g., a supply of alternating current electrical energy) is connected to the central contact 521 via a central triac 71. The power supply 70 is connected to the end portion contact 523 via an end portion triac 72. Control units 6 control an ON/OFF state of the central triac 71 and the end portion triac 72 independently of each other.

When the control unit 6 turns on the central triac 71, the power supply 70 energizes the central heating element 513. Accordingly, the central heating element 513 generates heat (e.g., thermal energy). When the control unit 6 turns on the end portion triac 72, the power supply 70 energizes the first end portion heating element 514 and the second end portion heating element 515. Accordingly, the first end portion heating element 514 and the second end portion heating element 515 generate heat. As described above, the heat generation of (a) the central heating element 513 and (b) the first end portion heating element 514 and the second end portion heating element 515 are controlled independently of each other. The central heating element 513, the first end portion heating element 514, and the second end portion heating element 515 are connected in parallel with respect to the power supply 70.

The power supply 70 is connected to the common contact 526 via the central thermostat 401 and the end portion thermostat 402. The central thermostat 401 and the end portion thermostat 402 are connected in series. When the temperature of the central heating element 513 rises abnormally, a temperature detected by the central thermostat 401 exceeds a predetermined temperature. In this case, the central thermostat 401 cuts off energization of the power supply 70 to the entire heat generating member 51.

When the temperature of the first end portion heating element 514 rises abnormally, a temperature detected by the end portion thermostat 402 exceeds a predetermined temperature. In this case, the end portion thermostat 402 cuts off the energization of the power supply 70 to the entire heat generating member 51. As described above, the heat generation of the first end portion heating element 514 and the second end portion heating element 515 are controlled in the same manner. Therefore, when the temperature of the second end portion heating element 515 rises abnormally, the temperature of the first end portion heating element 514 also rises in the same manner. Therefore, also when the temperature of the second end portion heating element 515 rises abnormally, the end portion thermostat 402 cuts off the energization of the power supply 70 to the entire heat generating member 51 in the same manner.

The control unit 6 acquires the temperature of the central heating element 513 by the central heater thermometer 411. The control unit 6 acquires the temperature of the second end portion heating element 515 by the end portion heater thermometer 412. The temperature of the second end portion heating element 515 is equal to the temperature of the first end portion heating element 514. The control units 6 measure the temperature of the heat generating member 51 by the heater thermometers 411 and 412 when the heating device 30 is started (e.g., warmed up) and when the heating device 30 returns from a pause state (e.g., a sleep state).

If at least one of the temperature of the central heating element 513 and the temperature of the second end portion heating element 515 is lower than a predetermined temperature when the heating device 30 is started or when the heating device 30 returns from the pause state, the control unit 6 causes the heat generating member 51 to generate heat for only a short time. Thereafter, the control unit 6 starts rotation of the pressure roller 31. Due to the heat generation of the heat generating member 51, the viscosity of the lubricant applied to the inner peripheral surface of the tubular body 36 decreases. As a result, slidability between the heater 37 and the tubular body 36 at a start of the rotation of the pressure roller 31 is ensured.

The control unit 6 acquires the temperature of the central portion of the tubular body 36 in the Y direction by the central belt thermometer 421. The control unit 6 acquires the temperature of the end portion of the tubular body 36 on the −Y side by the end portion belt thermometer 422. The temperature of the end portion of the tubular body 36 on the −Y side is equal to the temperature of the end portion of the tubular body 36 on the +Y side. During operation of the heating device 30, the control units 6 acquire the temperatures of the central portion and the end portion of the tubular body 36 in the Y direction.

The control units 6 execute phase control or wave number control on the electric power to be supplied to the heat generating member 51 by the central triac 71 and the end portion triac 72. The control unit 6 controls the energization of the central heating element 513 based on the temperature of the central portion of the tubular body 36 in the Y direction. The control units 6 control the energizations of the first end portion heating element 514 and the second end portion heating element 515 based on the temperature of the end portion of the tubular body 36 in the Y direction.

Figure 8:
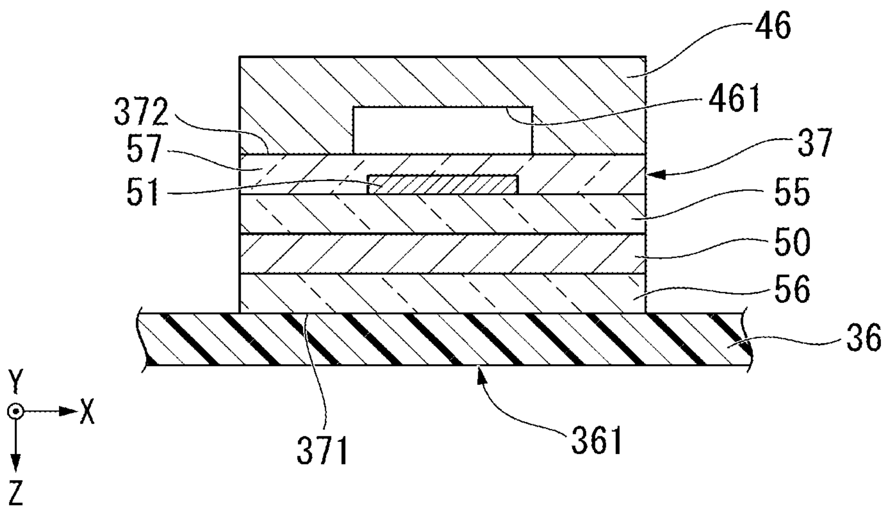
FIG. 8 is a diagram illustrating disposition of the heater and a heat equalizing member.

FIG. 8 is a diagram illustrating a disposition of the heater 37 and the heat equalizing member 46 according to the embodiment. As illustrated in FIG. 8, the heat equalizing member 46 has a concave portion 461 on an outer surface facing the heater 37 side. The concave portion 461 is formed in the Y direction so as to include a range in which the substrate 50 of the heater 37 is disposed. The concave portion 461 penetrates the heat equalizing member 46 in the Y direction. The concave portion 461 is not in contact with the heater 37. On the other hand, each of both sides of the heat equalizing member 46 in the X direction with respect to the concave portion 461 are in contact with the heater 37. In the present embodiment, each of both side portions of the heat equalizing member 46 in the X direction with respect to the concave portion 461 are in contact with the −Z side surface (the second surface 372 of the heater 37) of the second protective layer 57.

When printing is started in the image forming apparatus 1, the heat generating member 51 raises the temperature of the tubular body 36 to a fixing temperature. When the heat generating member 51 generates heat from a room temperature, for example, temperature distribution of the heat generating member 51 is highest at a center of the heat generating member 51 in the X direction. The temperature distribution of the heat generating member 51 decreases as a distance from the center of the heat generating member 51 in the X direction increases. As described above, the temperature distribution of the heat generating member 51 has a chevron shape having a temperature peak position. The temperature peak position of the heat generating member 51 is the center of the heat generating member 51 in the X direction. The concave portion 461 of the heat equalizing member 46 is formed so as to cover the center of the heat generating member 51 in the X direction.

Figure 9:
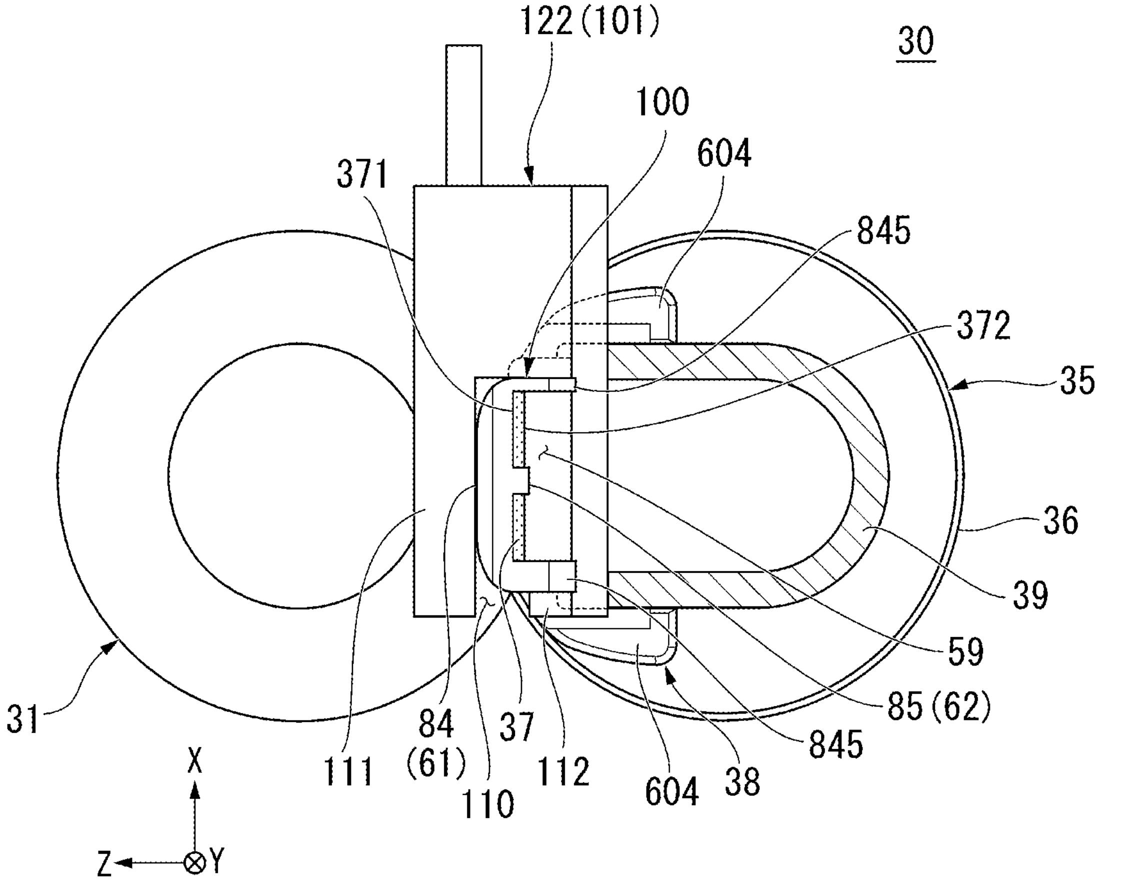
FIG. 9 is a diagram of the heating device as viewed from a rear side.
Figure 10:
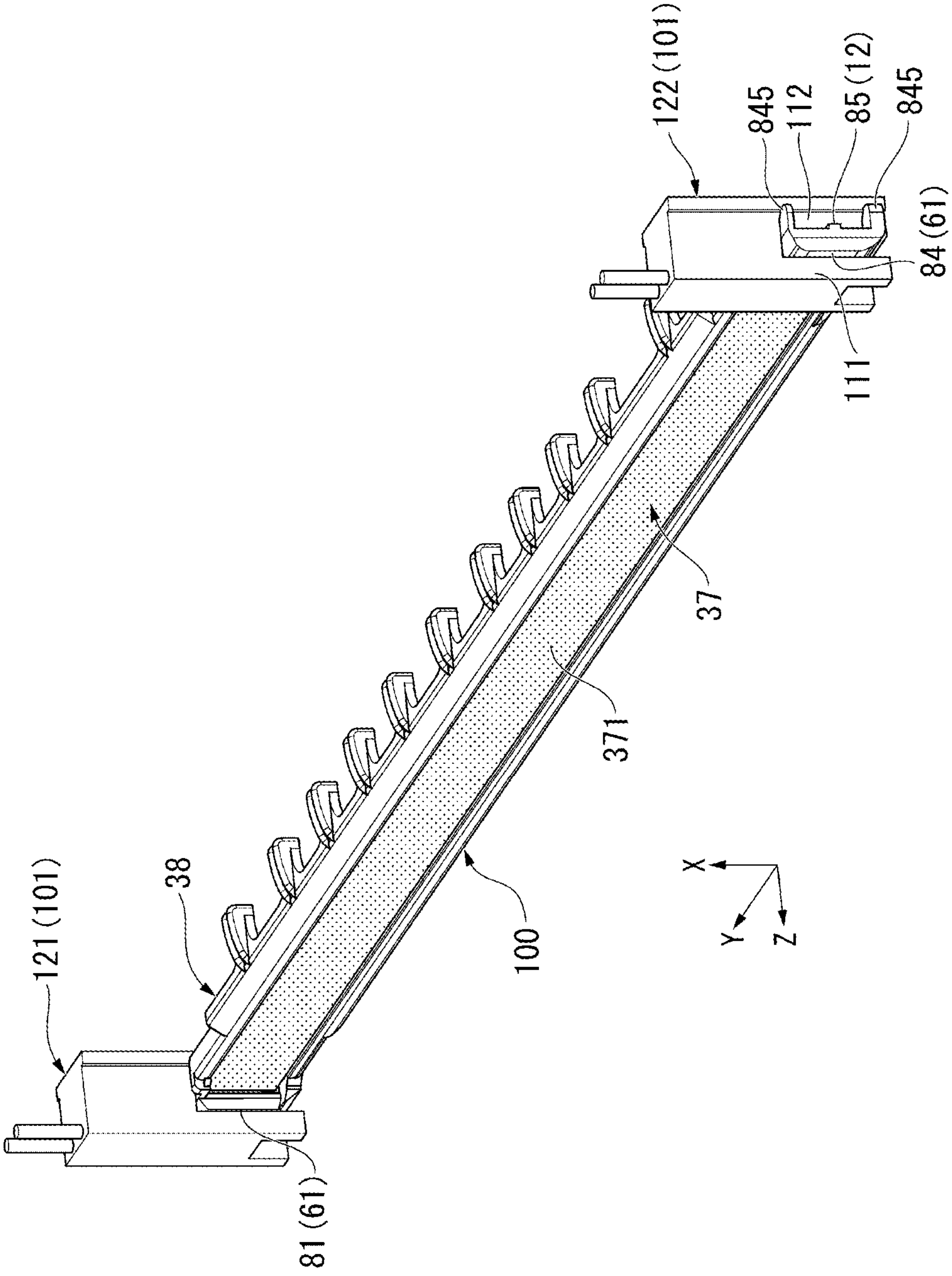
FIG. 10 is a perspective view illustrating mounting states of the heater, a support member, and power supply connectors.
Figure 11:
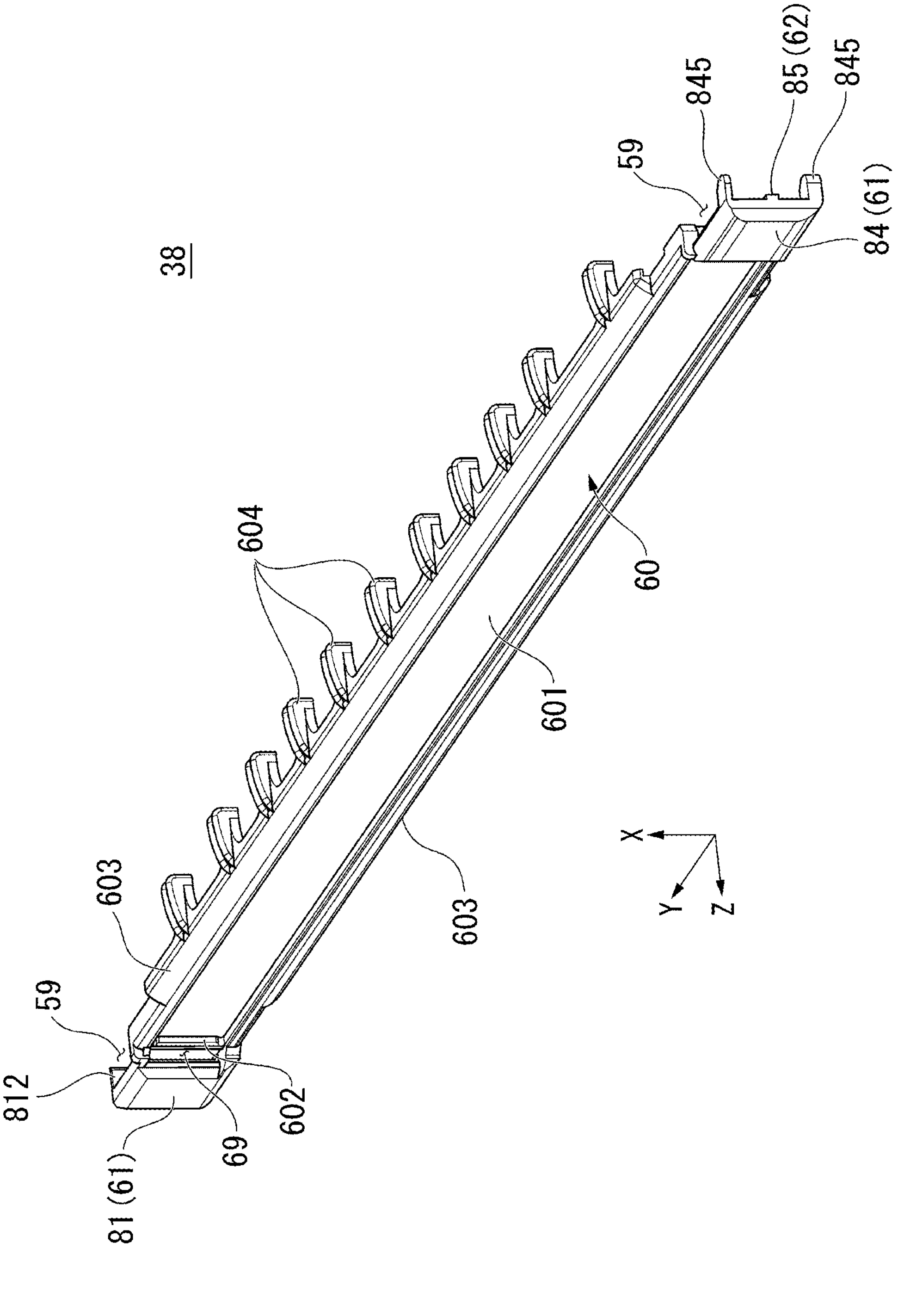
FIG. 11 is a perspective view of the support member.

Next, the support member 38 according to the embodiment will be described in detail. FIG. 9 is a diagram of the heating device 30 according to the embodiment as viewed from a rear side of the image forming apparatus 1. FIG. 10 is a perspective view illustrating mounting states of the heater 37, the support member 38, and power supply connectors 101 according to the embodiment. FIG. 11 is a perspective view of the support member 38 according to the embodiment. In FIGS. 9 and 10, the heater 37 is illustrated by dot hatching.

As illustrated in FIG. 10, the support member 38 has the Y direction (the axial direction of the tubular body 36) as the longitudinal direction. The support member 38 supports the attached heater 37 by being bent relative to the heater 37. In the present embodiment, the heater 37 is attached to the support member 38 by bending the support member 38 with respect to the heater 37. The support member 38 supports the heater 37 attached as described above. As illustrated in FIG. 9, an opening portion 59 for exposing the power supply unit is formed in the support member 38. As illustrated in FIG. 11, the support member 38 is formed of a single member that is continuous in the longitudinal direction of the support member 38.

An amount of deformation of the support member 38 in a direction intersecting the longitudinal direction and a lateral direction in a state in which the heater 37 is attached to the support member 38 is larger than an amount of deformation of the heater 37 in a direction intersecting the longitudinal direction and the lateral direction. The state in which the heater 37 is attached to the support member 38 corresponds to the mounting state of the heater 37 illustrated in FIG. 10. The amount of deformation of the support member 38 in the direction intersecting the longitudinal direction and the lateral direction corresponds to an amount of deformation of the support member 38 in the Z direction. The amount of deformation of the heater 37 in the direction intersecting the longitudinal direction and the lateral direction corresponds to an amount of deformation of the heater 37 in a thickness direction (the Z direction). In the present embodiment, the amount of deformation of the support member 38 in the Z direction in the mounting state of the heater 37 is larger than the amount of deformation of the heater 37 in the Z direction. For example, the amount of deformation of the support member 38 in the Z direction is set to a size that allows the heater 37 to be attached by bending only the support member 38 with respect to the heater 37. For example, the amount of deformation of the support member 38 in the Z direction may be larger than the amount of deformation of the heater 37 in a thickness direction (the Z direction) of the substrate 50.

As illustrated in FIG. 11, the support member 38 includes a support portion main body 60, first contact portions 61, second contact portions 62, and third contact portions 63. In the support portion main body 60, opening portions 59 are formed on end portion sides of the support member 38 in the longitudinal direction. The opening portions 59 are open to the −Z side of the support member 38. The support portion main body 60 is in contact with the second surface 372 side opposite to the first surface 371 side of the heater 37. In the present embodiment, the support portion main body 60 is in contact with the second surface 372 (a surface of the second protective layer 57) of the heater 37 via the heat equalizing member 46.

The support portion main body 60 includes a first support portion 601, second support portions 602, third support portions 603, and fourth support portions 604. The first support portion 601 has a longitudinal direction defined along the Y direction (the axial direction of the tubular body 36) as a longitudinal direction. The first support portion 601 faces the heat equalizing member 46. The first support portion 601 supports the second surface 372 of the heater 37 through the heat equalizing member 46.

The second support portions 602 are disposed at end portions of the first support portion 601 in the longitudinal direction. The second support portions 602 are in contact with end portions of the heat equalizing member 46 in the longitudinal direction. The second support portions 602 protrude to the +Z side from the end portions of the first support portion 601 in the longitudinal direction.

Figure 13:
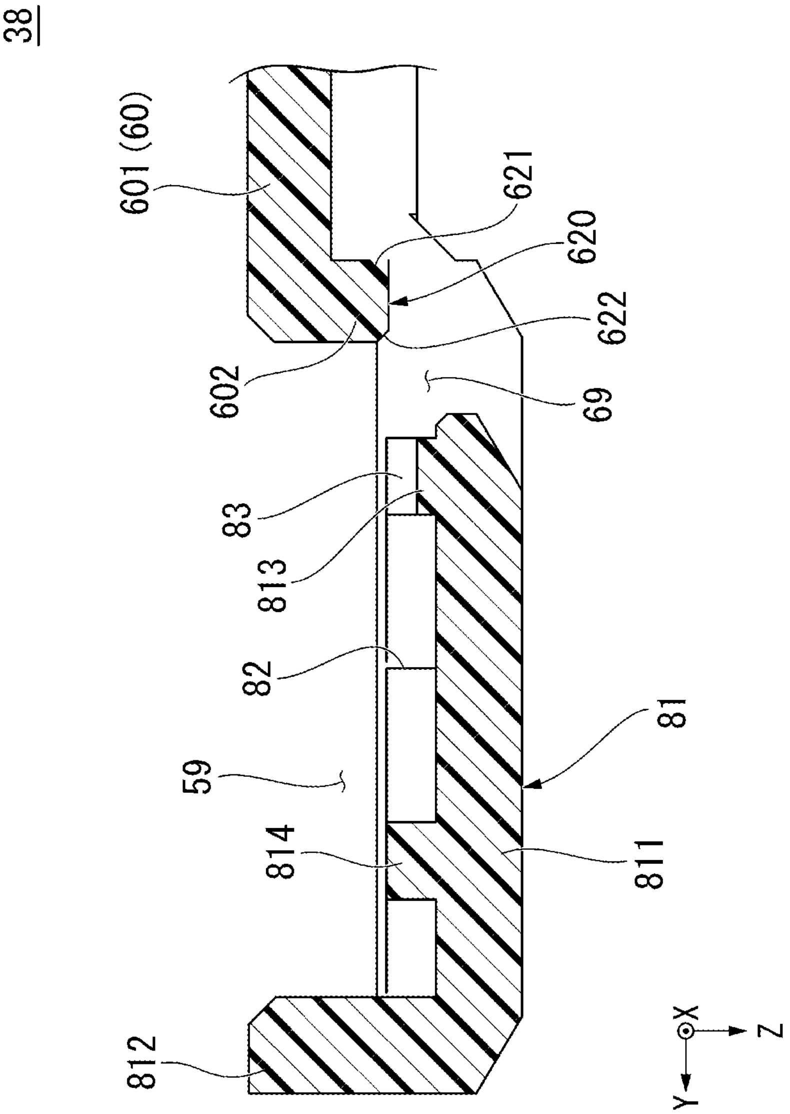
FIG. 13 is a cross-sectional view taken along a line XIII-XIII in FIG. 12.

As illustrated in FIG. 13, the second support portion 602 includes a guide surface 620 that guides the heater 37. The guide surface 620 includes a first inclined surface 621 and a second inclined surface 622 that are inclined with respect to the first support portion 601 in the longitudinal direction. In the cross-sectional view of FIG. 13, the first inclined surface 621 is inclined such that the first inclined surface 621 is located on the −Z side from an inner end in the Y direction of a +Z side surface of the second support portion 602 toward an inner side in the Y direction. In the cross-sectional view of FIG. 13, the second inclined surface 622 is inclined such that the second inclined surface 622 is located on the −Z side from an outer end in the Y direction of the +Z side surface of the second support portion 602 toward an outer side in the Y direction.

As illustrated in FIG. 11, the third support portions 603 are disposed at end portions of the first support portion 601 in the X direction (the lateral direction). The third support portions 603 are disposed on both sides of the first support portion 601 in the lateral direction. The third support portions 603 are in contact with the end portion of the heat equalizing member 46 in the Z direction (the lateral direction). The third support portions 603 support the end portions of the heater 37 in the lateral direction together with the heat equalizing member 46.

The fourth support portions 604 are provided in the third support portions 603. The plurality of fourth support portions 604 are disposed at intervals in the longitudinal direction of the first support portion 601. The fourth support portions 604 are provided on the third support portions 603 on each of both sides in the X direction. The fourth support portions 604 are in contact with the inner peripheral surface of the tubular body 36. Round chamfers are formed at outer end portions of the fourth support portions 604 in the X direction. The fourth support portions 604 support the inner peripheral surface of the tubular body 36 on the outer side of the heater 37 in the X direction.

The first contact portion 61 is disposed via a gap 69 that opens to allow the heater 37 to be movable in the axial direction with respect to the support portion main body 60. The first contact portion 61 is in contact with the first surface 371 of the heater 37. The gap 69 is formed between the second support portion 602 and the first contact portion 61.

The second contact portions 62 are disposed via the opening portions 59 with respect to the support portion main body 60. The second contact portions 62 are in contact with end portions of the heater 37 in the longitudinal direction.

The third contact portion 63 is disposed between the first contact portion 61 and the second contact portion 62 in the longitudinal direction of the support member 38. The third contact portion 63 is in contact with each end portion of the heater 37 in the lateral direction.

In the present embodiment, the first contact portions 61, the second contact portions 62, and the third contact portions 63 are respectively disposed on both sides of the support member 38 in the longitudinal direction. One side (the +Y side) of the support member 38 in the longitudinal direction corresponds to a front side of the image forming apparatus 1. The other side (the −Y side) of the support member 38 in the longitudinal direction corresponds to a rear side of the image forming apparatus 1. Hereinafter, the first contact portion 61, the second contact portion 62, and the third contact portion 63 disposed on the front side of the image forming apparatus 1 are referred to as a first front side contact portion 81, a second front side contact portion 82, and a third front side contact portion 83, respectively. Hereinafter, the first contact portion 61, the second contact portion 62, and the third contact portion 63 disposed on the rear side of the image forming apparatus 1 are referred to as a first rear side contact portion 84, a second rear side contact portion 85, and a third rear side contact portion 86, respectively.

Figure 12:
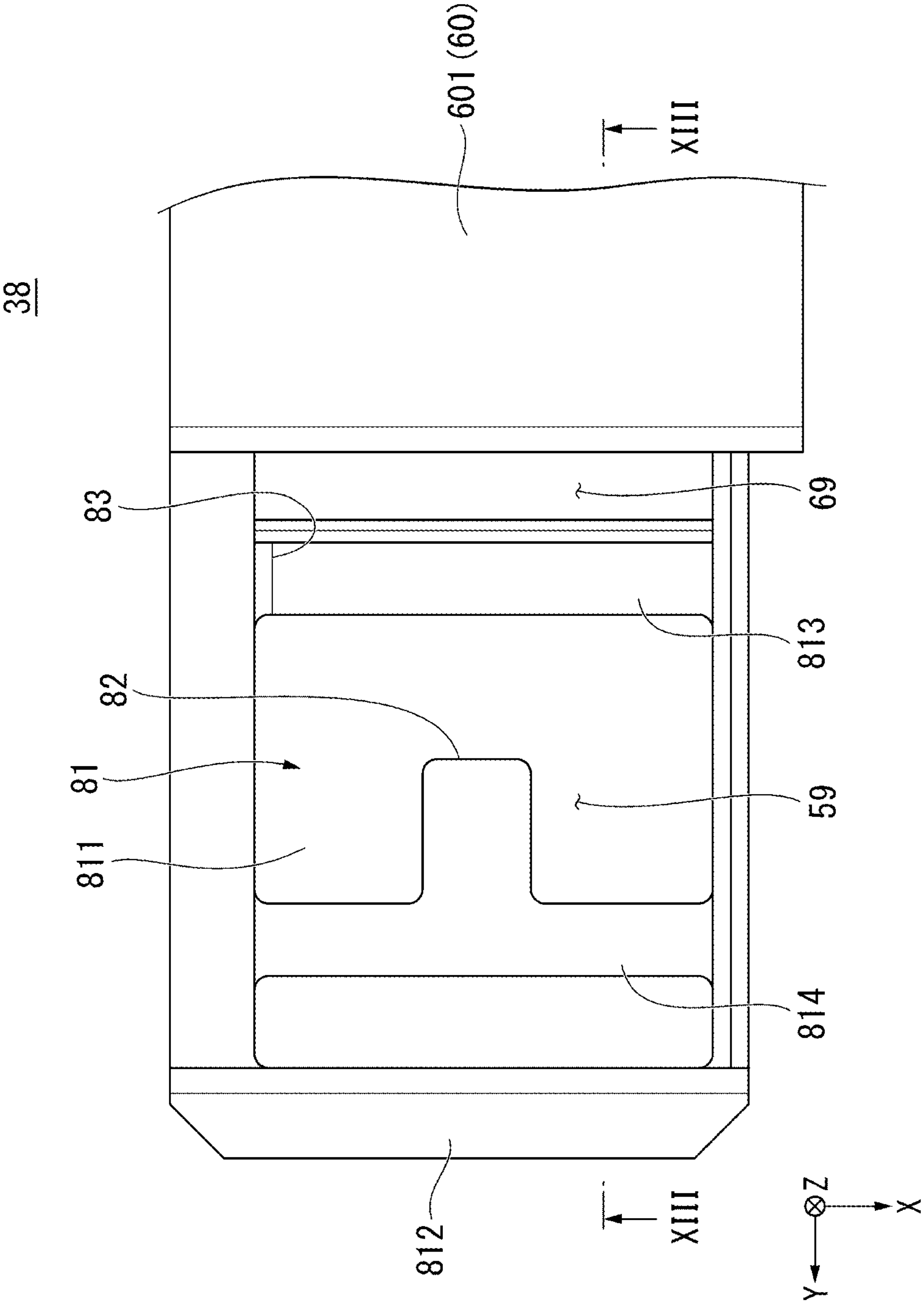
FIG. 12 is a plan view including a front side end portion of the support member.

As illustrated in FIG. 12, the first front side contact portion 81 includes a first front side wall portion 811, a second front side wall portion 812, a third front side wall portion 813, and a fourth front side wall portion 814. The first front side wall portion 811 faces the first surface 371 of the heater 37 on the +Y side end side of the heater 37.

The second front side wall portion 812 is disposed at an end portion (the +Y side end portion) of the first front side wall portion 811 opposite to the first support portion 601. As illustrated in FIG. 13, the second front side wall portion 812 protrudes to the −Z side from the +Y side end portion of the first front side wall portion 811. As illustrated in FIG. 12, the second front side wall portion 812 extends in the X direction of the first front side wall portion 811.

The third front side wall portion 813 is disposed between the +Y side end portion of the support portion main body 60 and the second front side wall portion 812. As illustrated in FIG. 13, the third front side wall portion 813 protrudes to the −Z side from a back surface (a −Z side surface) of the first front side wall portion 811. As illustrated in FIG. 12, the third front side wall portion 813 extends in the X direction of the first front side wall portion 811. The third front side wall portion 813 is in contact with the first surface 371 of the heater 37 on the +Y side end side of the heater 37.

The fourth front side wall 814 is disposed between the second front side wall portion 812 and the third front side wall portion 813. As illustrated in FIG. 13, the fourth front side wall portion 814 protrudes to the −Z side from the back surface of the first front side wall portion 811. As illustrated in FIG. 12, the fourth front side wall portion 814 extends in the X direction of the first front side wall portion 811. The fourth front side wall portion 814 extends substantially parallel to the third front side wall portion 813. As illustrated in FIG. 13, a thickness of the fourth front side wall portion 814 in the Z direction is larger than a thickness of the third front side wall portion 813 in the Z direction. The thickness of the fourth front side wall portion 814 in the Z direction is larger than a thickness of the heater 37 in the Z direction.

The second front side contact portion 82 is in contact with the +Y side end portion of the heater 37 in the longitudinal direction. The second front side contact portion 82 is disposed on an inner side portion of the fourth front side wall portion 814 in the Y direction. As illustrated in FIG. 12, the second front side contact portion 82 protrudes to the −Y side from a central portion of the fourth front side wall portion 814 in the X direction. In the plan view of FIG. 12, an outer shape of a portion in which the second front side contact portion 82 and the fourth front side wall portion 814 are combined is a T-shape. The second front side contact portion 82 is in contact with a central portion in the X direction on a +Y side end edge of the heater 37 in the longitudinal direction. As illustrated in FIG. 13, a thickness of the second front side contact portion 82 in the Z direction is the same as the thickness of the fourth front side wall portion 814 in the Z direction. The thickness of the second front side contact portion 82 in the Z direction is larger than the thickness of the heater 37 in the Z direction.

The third front side contact portion 83 is in contact with the end portion of the heater 37 in the lateral direction on the +Y side end side of the heater 37. As illustrated in FIG. 12, the third front side contact portion 83 is disposed at an end portion of the third front side wall portion 813 in the X direction. As illustrated in FIG. 13, the third front side contact portion 83 protrudes to the −Z side from the end portion of the third front side wall portion 813 in the X direction. A thickness of the third front side contact portion 83 in the Z direction is substantially the same as the thickness of the heater 37 in the Z direction.

Figure 14:
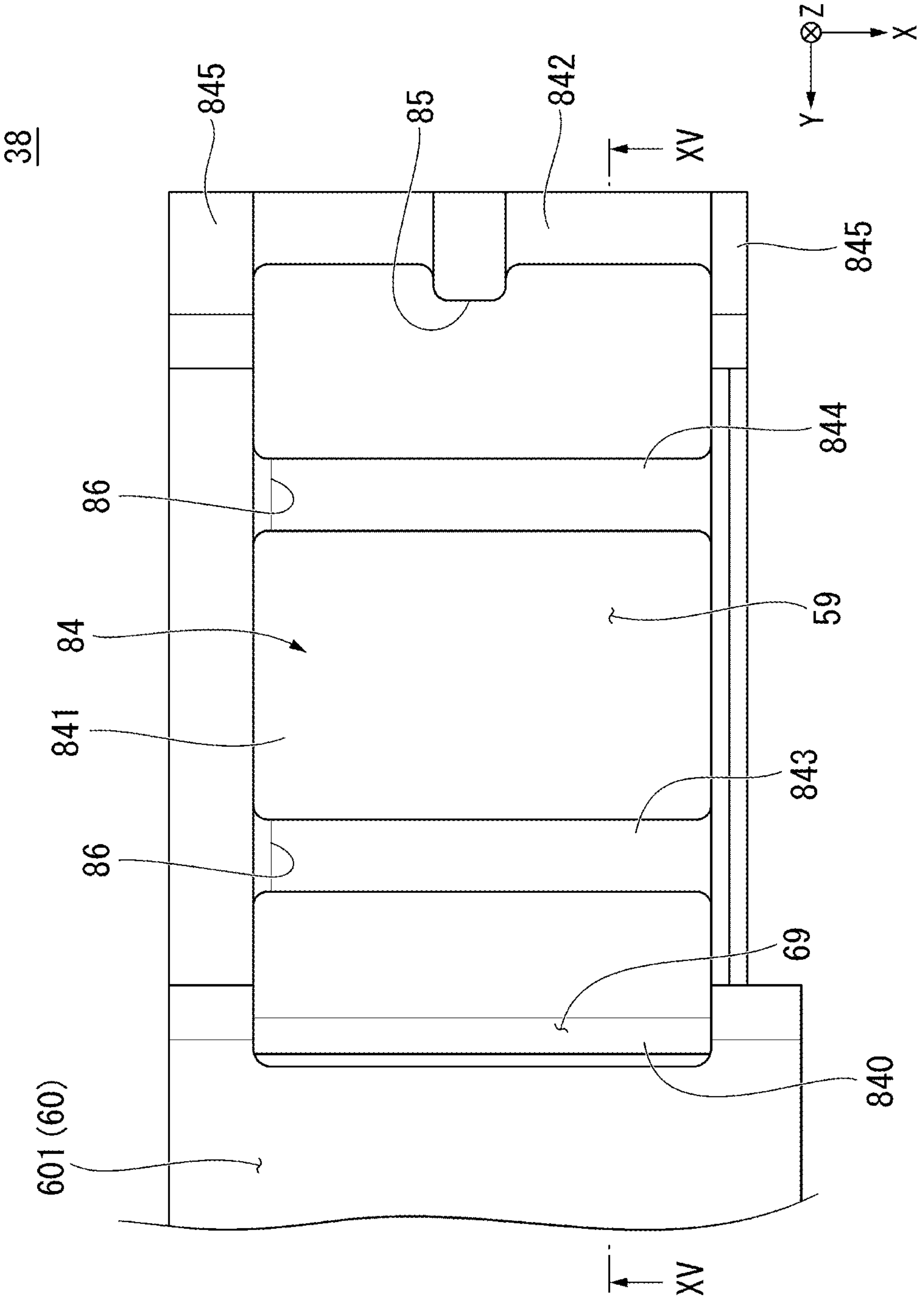
FIG. 14 is a plan view including a rear side end portion of the support member.

As illustrated in FIG. 14, the first rear side contact portion 84 includes a first rear side wall portion 841, a second rear side wall portion 842, a third rear side wall portion 843, and a fourth rear side wall portion 844. The first rear side wall portion 841 faces the first surface 371 of the heater 37 on the −Y side end side of the heater 37.

Figure 15:
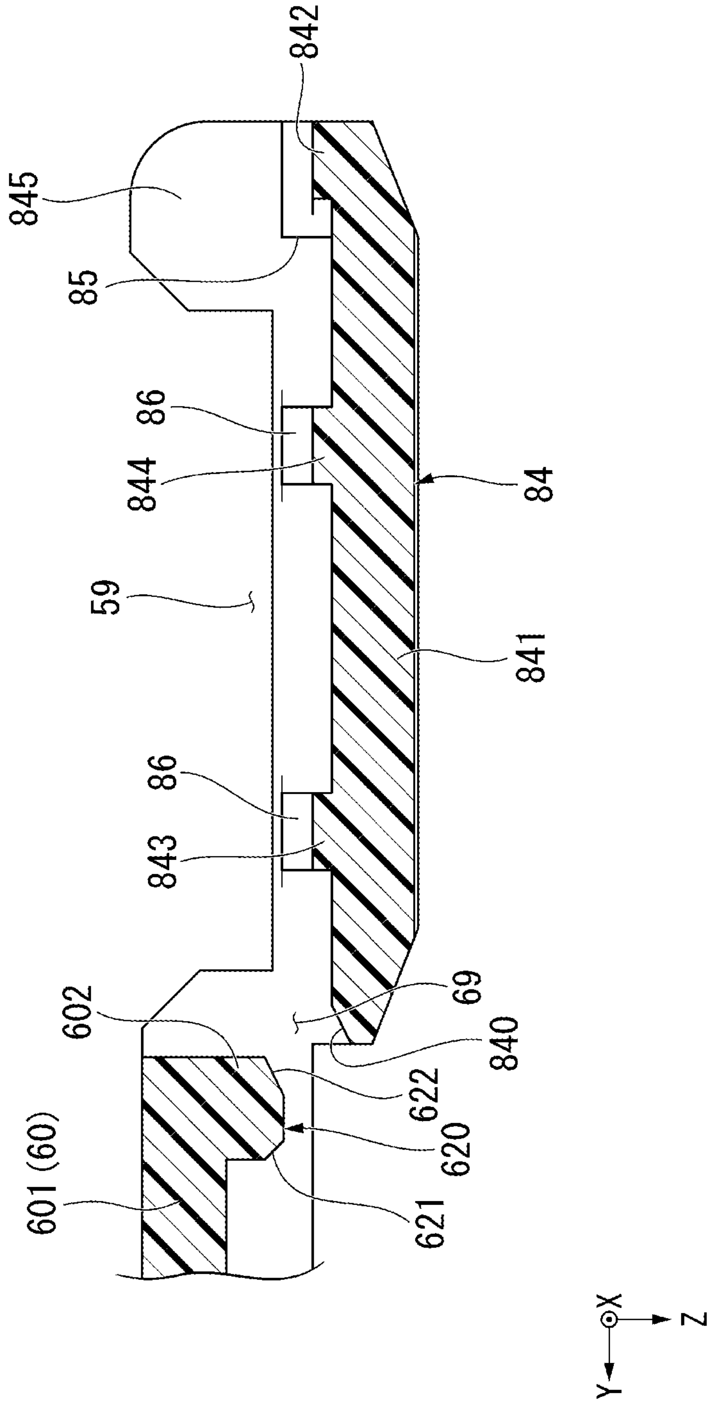
FIG. 15 is a cross-sectional view taken along a line XV-XV in FIG. 14.

As illustrated in FIG. 15, the first rear side wall portion 841 includes a guide surface 840 that guides the heater 37. The guide surface 840 is formed in a portion of the first rear side wall portion 841 facing the gap 69. The guide surface 840 is inclined with respect to the first support portion 601 in the longitudinal direction. In the cross-sectional view of FIG. 15, the guide surface 840 is inclined such that the guide surface 840 is located on the −Z side from the −Z side end portion of the +Y side surface of the first rear side wall portion 841 toward the −Y side. In the cross-sectional view of FIG. 15, the guide surface 840 of the first rear side wall portion 841 is substantially parallel to the second inclined surface 622 of the second support portion 602.

The second rear side wall portion 842 is disposed at an end portion (the −Y side end portion) of the first rear side wall portion 841 opposite to the first support portion 601. The second rear side wall portion 842 protrudes to the −Z side from the −Y side end portion of the first rear side wall portion 841. A convex portion 845 that protrudes to the −Z side with respect to the second rear side wall portion 842 is provided at an end portion of the second rear side wall portion 842 in the X direction. As illustrated in FIG. 14, a pair of convex portions 845 are disposed at an interval in the X direction. The disposition interval of the pair of convex portions 845 is large enough to move the heater 37 in the axial direction. The interval between the pair of convex portions 845 in the X direction is larger than a length of the heater 37 in the X direction.

The third rear side wall portion 843 is disposed between the −Y side end portion of the support portion main body 60 and the second rear side wall portion 842. As illustrated in FIG. 15, the third rear side wall portion 843 protrudes to the −Z side from the back surface (the −Z side surface) of the first rear side wall portion 841. As illustrated in FIG. 14, the third rear side wall portion 843 extends in the X direction of the first rear side wall portion 841. The third rear side wall portion 843 is in contact with the first surface 371 of the heater 37 on the −Y side end side of the heater 37.

The fourth rear side wall portion 844 is disposed between the second rear side wall portion 842 and the third rear side wall portion 843. The fourth rear side wall portion 844 protrudes to the −Z side from the back surface of the first rear side wall portion 841. The fourth rear side wall portion 844 extends in the X direction of the first rear side wall portion 841. The fourth rear side wall portion 844 extends substantially parallel to the third rear side wall portion 843. A thickness of the fourth rear side wall portion 844 in the Z direction is the same as a thickness of the third rear side wall portion 843 in the Z direction. The fourth rear side wall portion 844 is in contact with the first surface 371 of the heater 37 on the −Y side end side of the heater 37.

The second rear side contact portion 85 is in contact with the −Y side end portion of the heater 37 in the longitudinal direction. The second rear side contact portion 85 is disposed at a position overlapping with the second rear side wall portion 842 as viewed from the Z direction. The second rear side contact portion 85 protrudes to the +Y side from the central portion of the second rear side wall portion 842 in the X direction. The second rear side contact portion 85 is in contact with a central portion in the X direction on a −Y side end edge of the heater 37 in the longitudinal direction. As illustrated in FIG. 15, a thickness of the second rear side contact portion 85 in the Z direction is larger than a thickness of the second rear side wall portion 842 in the Z direction. The thickness of the second rear side contact portion 85 in the Z direction is larger than the thickness of the heater 37 in the Z direction. The thickness of the second rear side contact portion 85 in the Z direction may be smaller than the thickness of the second front side contact portion 82 in the Z direction.

The third rear side contact portion 86 is in contact with the end portion of the heater 37 in the lateral direction on the −Y side end side of the heater 37. As illustrated in FIG. 14, the third rear side contact portion 86 is disposed at an end portion of each of the third rear side wall portion 843 and the fourth rear side wall portion 844 in the X direction. As illustrated in FIG. 15, the third rear side contact portion 86 protrudes to the −Z side from the end portion of each of the third rear side wall portion 843 and the fourth rear side wall portion 844 in the X direction. A thickness of the third rear side contact portion 86 in the Z direction is substantially the same as the thickness of the heater 37 in the Z direction.

Figure 16:
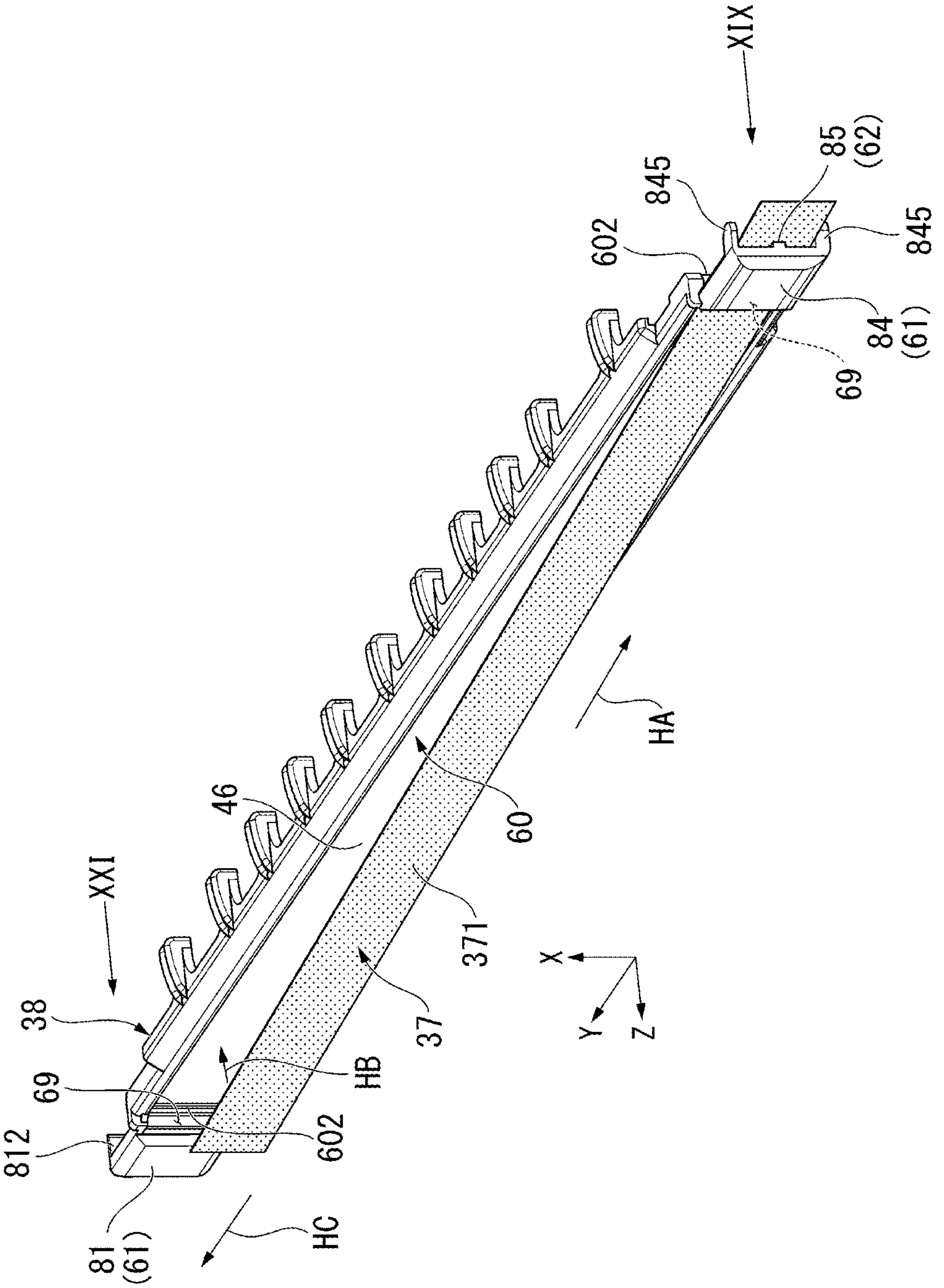
FIG. 16 is a diagram illustrating an example of a method for mounting the heater.
Figure 17:
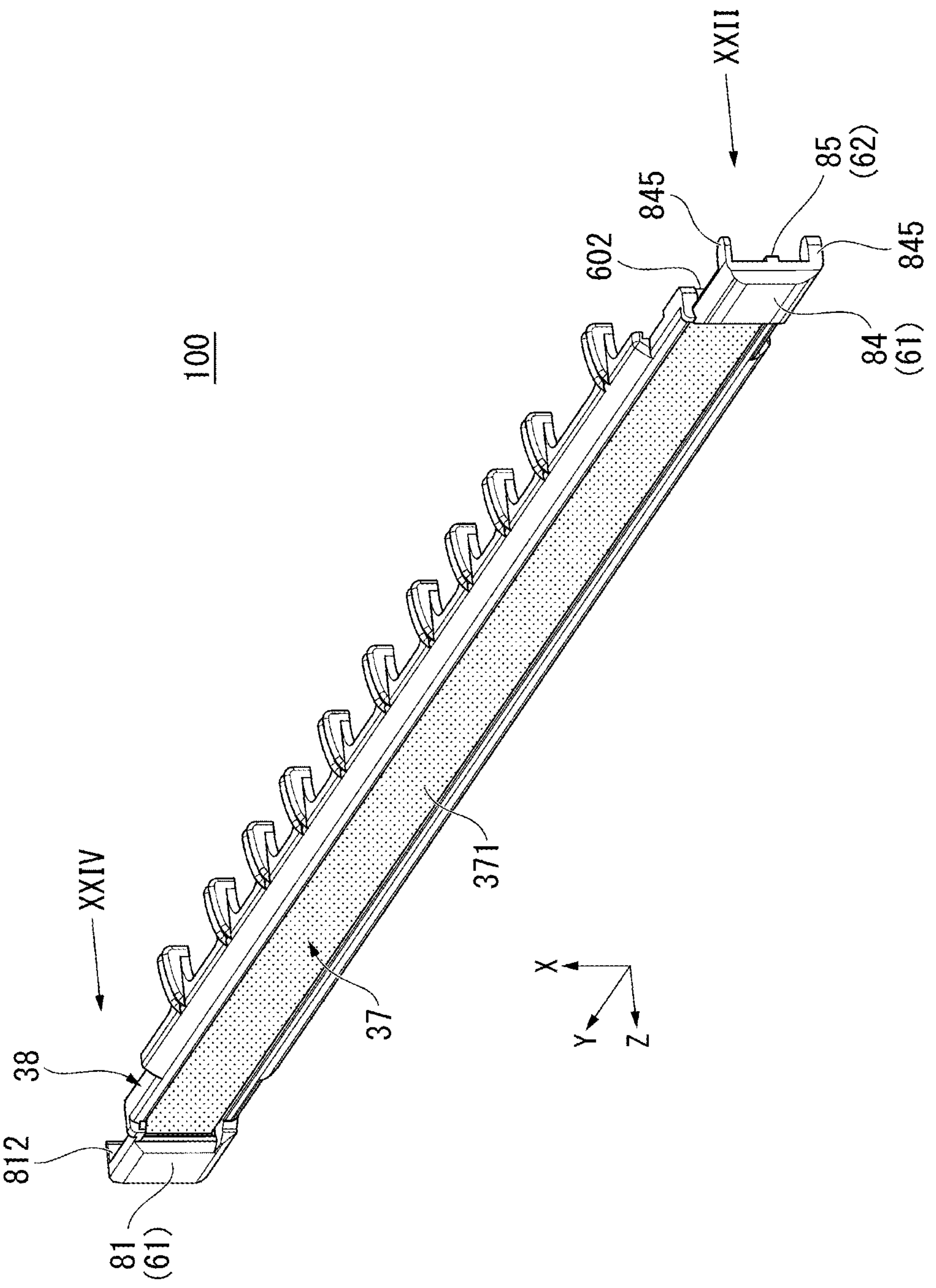
FIG. 17 is a diagram illustrating the example of the method, following FIG. 16.
Figure 18:
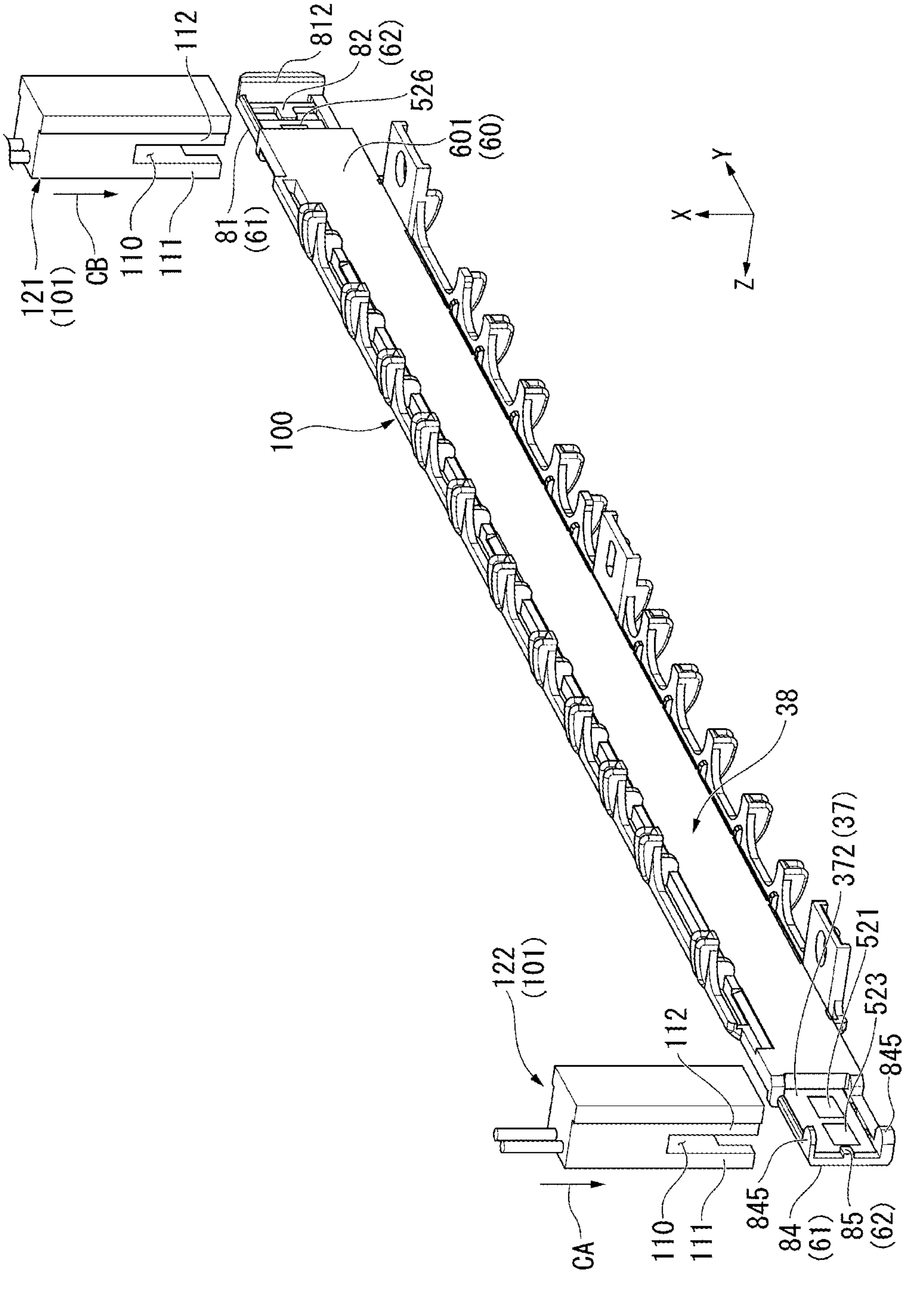
FIG. 18 is a diagram illustrating the example of the method, following FIG. 17.

Next, an example of a method for mounting the heater 37 will be described. FIG. 16 is a diagram illustrating an example of the method for mounting the heater according to the embodiment. FIG. 17 is a diagram illustrating the example of the method for mounting the heater according to the embodiment, following FIG. 16. FIG. 18 is a diagram illustrating the example of the method for mounting the heater according to the embodiment, following FIG. 17. FIGS. 16-18 may represent consecutive steps of the method for mounting the heater according to the embodiment.

As illustrated in FIG. 16, first, the −Y side end portion of the heater 37 is obliquely inserted into the gap 69 on the rear side. For example, the heater 37 is moved in a direction of an arrow HA in a state in which the support member 38 is along the Y direction. In the present embodiment, the heating device 30 is assembled by inclining the heater 37 and bending the support member 38 (e.g., from an unbent or resting configuration to a bent configuration). In this case, the −Y side end portion of the heater 37 is inserted by bending the support member 38 away from the heater 37 such that the −Y side end portion of the heater 37 is not caught by the second support portion 602 on the rear side of the support member 38.

Figure 20:
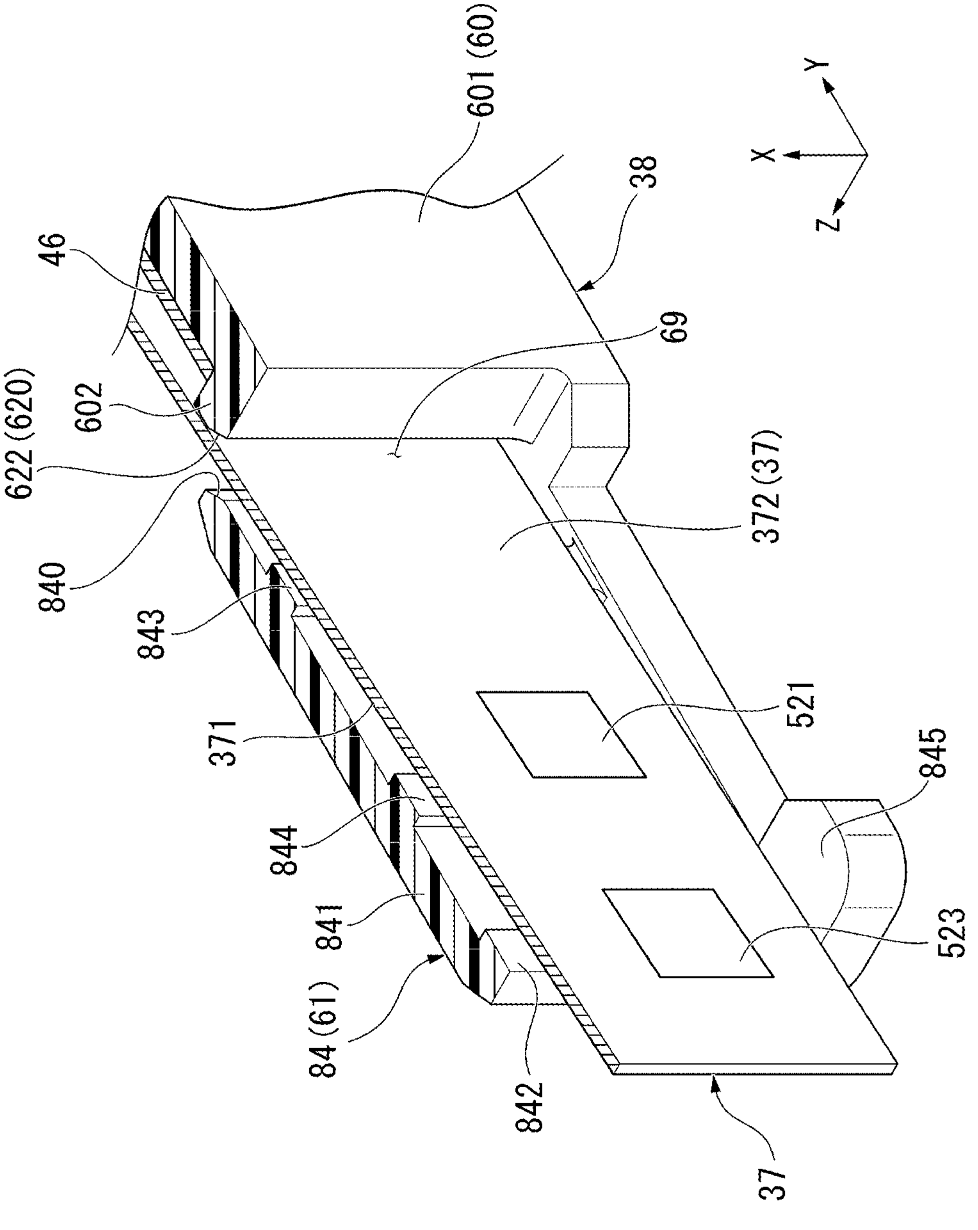
FIG. 20 is a perspective view including a cross section taken along a line XX-XX in FIG. 19.

For example, when the −Y side end portion of the heater 37 is inserted into the gap 69 on the rear side, the guide surfaces 620 and 840 on the rear side may be used. As illustrated in FIG. 20, the second surface 372 on the −Y side end side of the heater 37 may be along the second inclined surface 622 (the guide surface 620) of the second support portion 602 on the rear side. Alternatively, the first surface 371 on the −Y side end side of the heater 37 may be along the guide surface 840 of the first rear side wall portion 841. As a result, the −Y side end portion of the heater 37 can smoothly pass through the gap 69 on the rear side while the bending of the support member 38 is reduced as much as possible.

Figure 19:
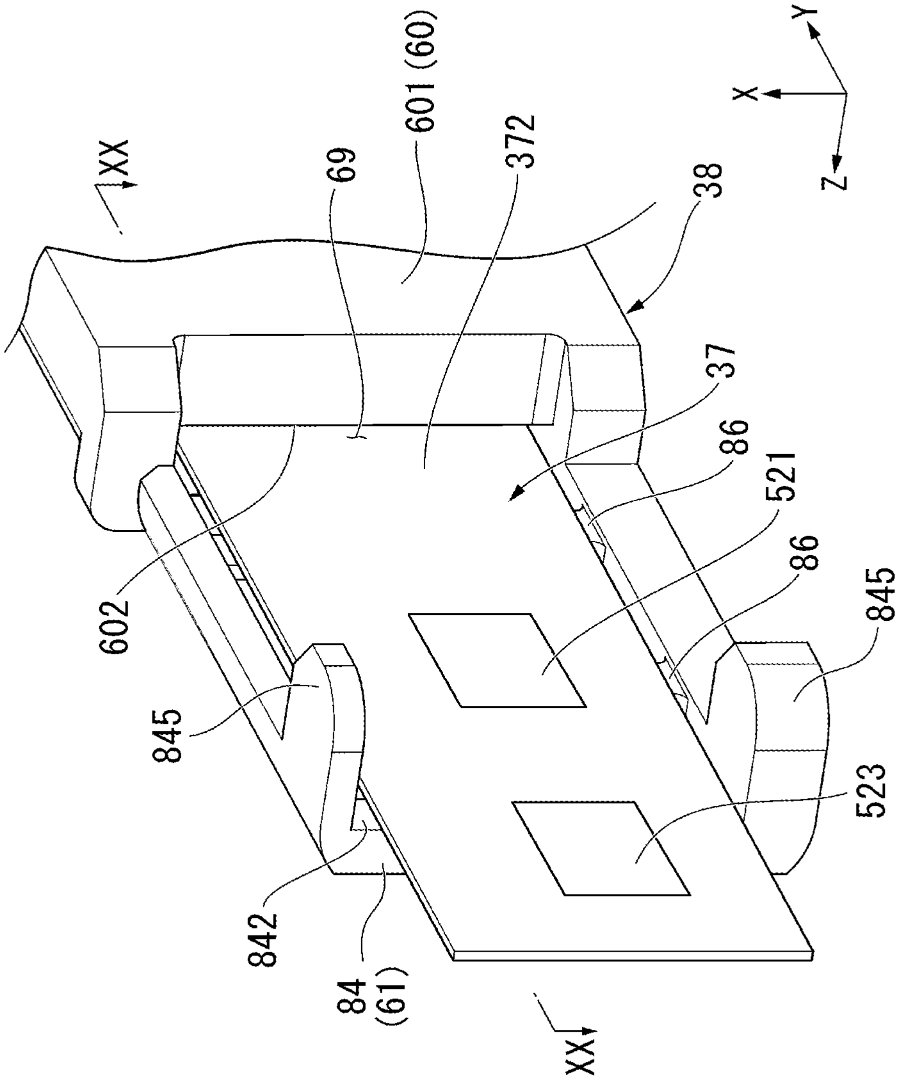
FIG. 19 is a perspective view including the rear side end portion of the support member, as viewed from an arrow XIX in FIG. 16.

As illustrated in FIG. 19, the −Y side end portion of the heater 37 passes through the gap 69 on the rear side, and then passes through between the pair of convex portions 845. As a result, the −Y side end portion of the heater 37 protrudes to the −Y side with respect to the second rear side wall portion 842. In this case, the −Y side end portion of the heater 37 may be inserted using the bending of the support member 38 such that the −Y side end portion of the heater 37 is not caught by the second rear side contact portion 85 of the support member 38.

For example, the thickness of the second rear side contact portion 85 in the Z direction may be set such that the second rear side contact portion 85 does not overlap with a movement trajectory of the heater 37 when the −Y side end portion of the heater 37 passes through the gap 69 on the rear side. As illustrated in FIG. 15, for example, the thickness of the second rear side contact portion 85 in the Z direction may be smaller than the thickness in the Z direction of the third rear side contact portion 86 located on the +Y side with respect to the second rear side contact portion 85. Accordingly, the −Y side end portion of the heater 37 can protrude to the −Y side with respect to the second rear side wall portion 842 while the bending of the support member 38 is reduced as much as possible.

For example, when the −Y side end portion of the heater 37 protrudes further to the −Y side with respect to the second rear side wall portion 842, the −Y side end portion of the heater 37 may protrudes to a position illustrated in FIG. 16. As illustrated in FIG. 16, the −Y side end portion of the heater 37 may protrude to the −Y side with respect to the second rear side wall portion 842 until the +Y side end portion of the heater 37 is located on the −Y side with respect to the −Y side end portion of the first front side contact portion 81. Accordingly, in a next step, the +Y side end portion of the heater 37 can be inserted into the gap 69 on the front side while the bending of the support member 38 is reduced as much as possible.

Figure 21:
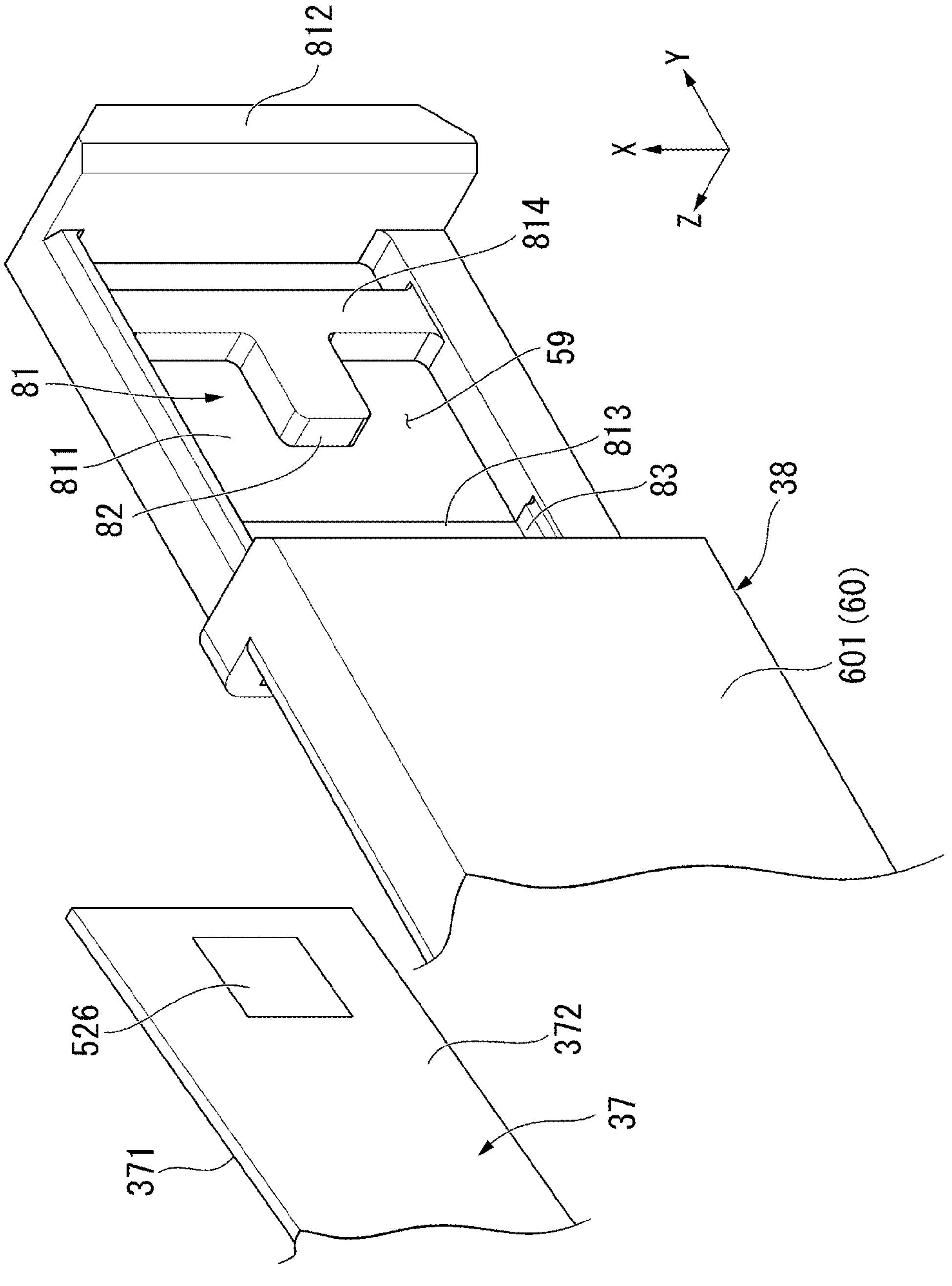
FIG. 21 is a perspective view including the front side end portion of the support member, as viewed from an arrow XXI in FIG. 16.

As illustrated in FIG. 21, in a state in which the +Y side end portion of the heater 37 is located on the −Y side with respect to the −Y side end portion of the first front side contact portion 81, the heater 37 is inclined with respect to the support member 38 in the longitudinal direction. In the state illustrated in FIG. 21, the +Y side end portion of the heater 37 is located on the +Z side with respect to the first front side contact portion 81.

Next, the +Y side end portion of the heater 37 is inserted into the gap 69 on the front side. For example, first, the +Y side end portion of the heater 37 is moved to the −Z side in a state in which the −Y side end portion of the heater 37 protrudes to the −Y side with respect to the second rear side wall portion 842. For example, the heater 37 is moved in the direction of the arrow HA in FIG. 16, and then is moved in a direction of an arrow HB. The heat equalizing member 46 is mounted in advance on the support member 38. The heat equalizing member 46 is disposed in advance between the second support portion 602 on the front side and the second support portion 602 on the rear side.

For example, when moving the +Y side end portion of the heater 37 to the −Z side, the +Y side end portion of the heater 37 may be moved until the second surface 372 of the heater 37 comes into contact with the +Z side end portion of the heat equalizing member 46. For example, the +Y side end portion of the heater 37 may be moved to the −Z side until the heater 37 overlaps with the gap 69 on the front side as viewed from the Y direction. Accordingly, the +Y side end portion of the heater 37 can be inserted into the gap 69 on the front side while the bending of the support member 38 is reduced as much as possible.

Next, the +Y side end portion of the heater 37 is inserted into the gap 69 on the front side by moving the heater 37 to the +Y side. For example, after the heater 37 is moved in the direction of the arrow HB in FIG. 16, the heater 37 is moved in a direction of an arrow HC. In this case, the heater 37 is inserted by bending the support member 38 such that the +Y side end portion of the heater 37 is not caught by the second support portion 602 on the front side.

For example, when the +Y side end portion of the heater 37 is inserted into the gap 69 on the front side, the guide surface 620 on the front side may be used. For example, the second surface 372 of the heater 37 on the +Y side end side of the heater 37 may be along the first inclined surface 621 (e.g., of the guide surface 620) of the second support portion 602 on the front side. The first inclined surface 621 may facilitate aligning the +Y side end of the heater 37 with the gap 69 in the Z direction. As a result, the +Y side end portion of the heater 37 can smoothly pass through the gap 69 on the front side while the bending of the support member 38 is reduced as much as possible.

Figure 24:
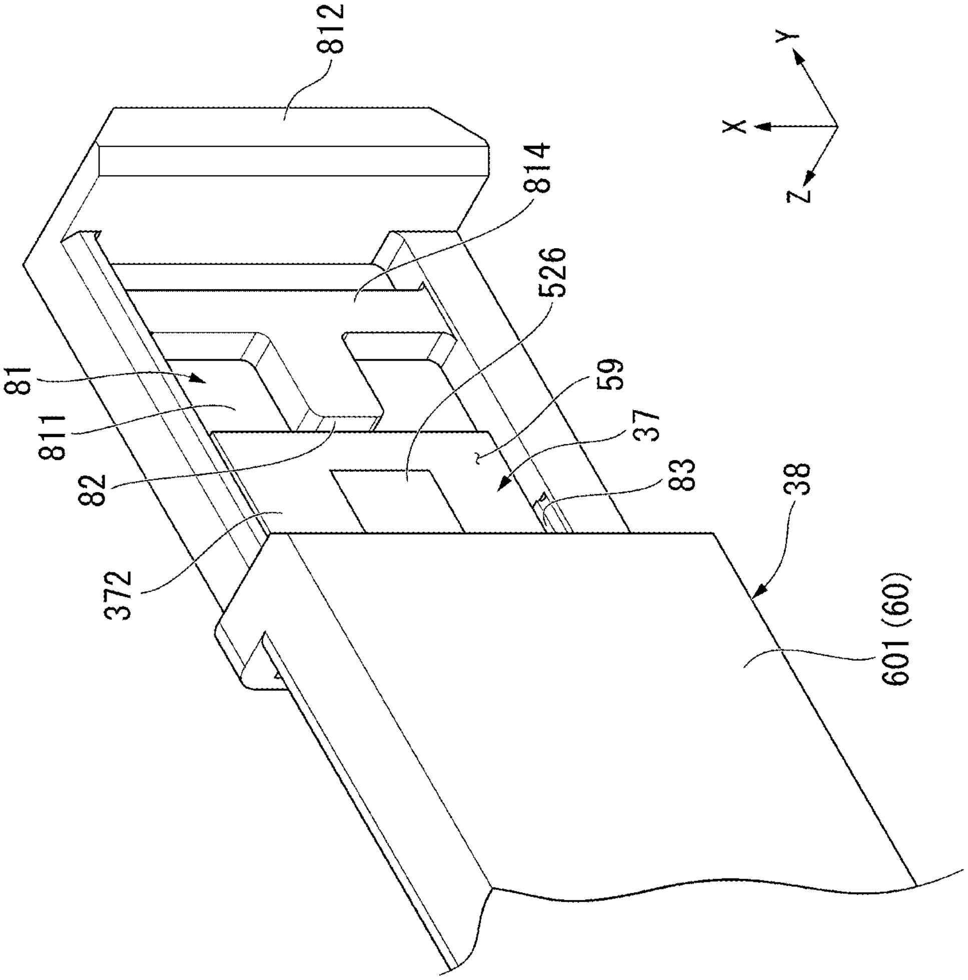
FIG. 24 is a perspective view including the front side end portion of the support member, as viewed from an arrow XXIV in FIG. 17.

After the +Y side end portion of the heater 37 is inserted into the gap 69 on the front side, the heater 37 is further moved to the +Y side. Next, the +Y side end portion of the heater 37 is brought into contact with the second front side contact portion 82. As a result, as illustrated in FIG. 17, the heater 37 is mounted on the support member 38. As illustrated in FIG. 24, in a state in which the heater 37 is mounted, since the +Y side end portion of the heater 37 is in contact with the second front side contact portion 82, the movement of the heater 37 to the +Y side is restricted.

In the state in which the heater 37 is mounted, the first surface 371 on the +Y side end side of the heater 37 is in contact with the third front side wall portion 813. Therefore, movement of the heater 37 to the +Z side is restricted by the third front side wall portion 813. In the state in which the heater 37 is mounted, the second surface 372 on the +Y side end side of the heater 37 is in contact with the second support portion 602 on the front side. Therefore, movement of the heater 37 to the −Z side is restricted by the second support portion 602 on the front side. In the state in which the heater 37 is mounted, an end portion of the heater 37 in the lateral direction on the +Y side end side is in contact with the third front side contact portion 83. Therefore, movement of the heater 37 in the X direction is restricted by the third front side contact portion 83.

For example, the third front side contact portion 83 may be disposed at both end portions of the third front side wall portion 813 in the X direction. As a result, in the state in which the heater 37 is mounted, both end portions of the heater 37 in the lateral direction on the +Y side end side are in contact with the third front side contact portion 83 on both sides in the X direction. Therefore, the movement of the heater 37 to both sides in the X direction (+X side and −X side) is restricted by the third front side contact portion 83.

Figure 22:
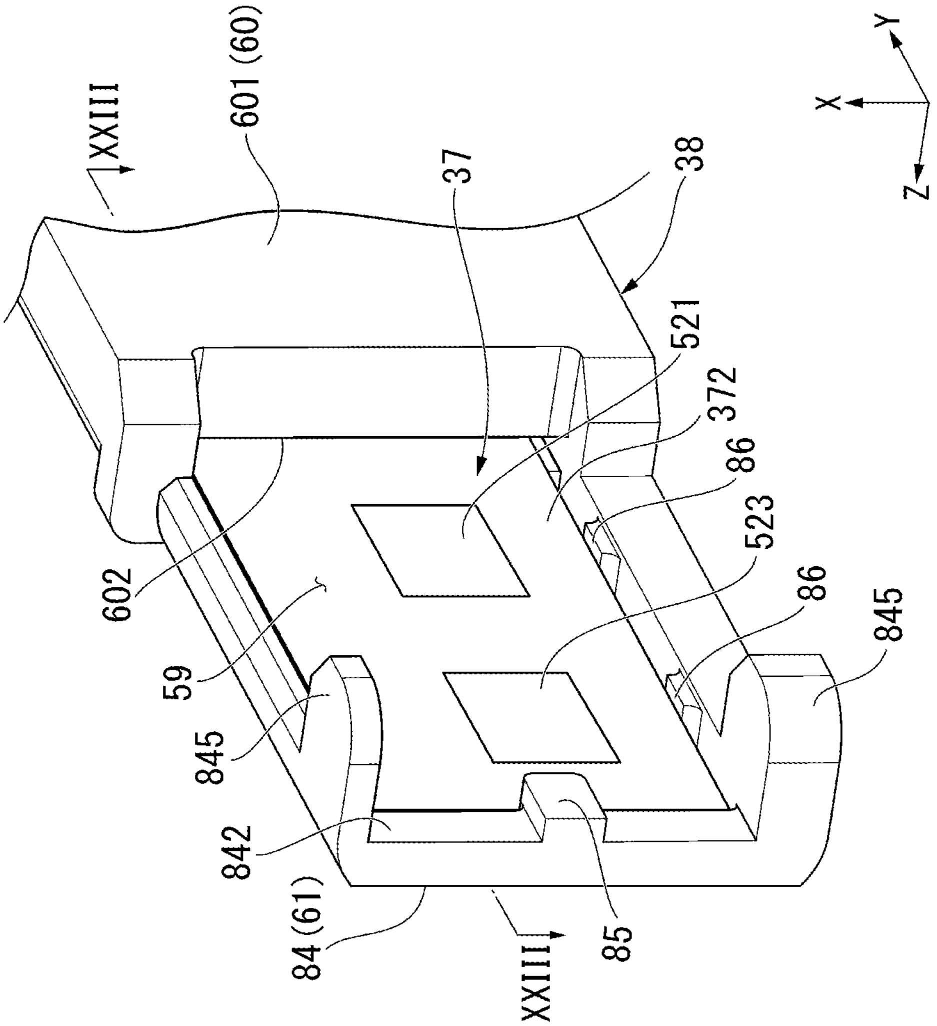
FIG. 22 is a perspective view including the rear side end portion of the support member, as viewed from an arrow XXII in FIG. 17.
Figure 23:
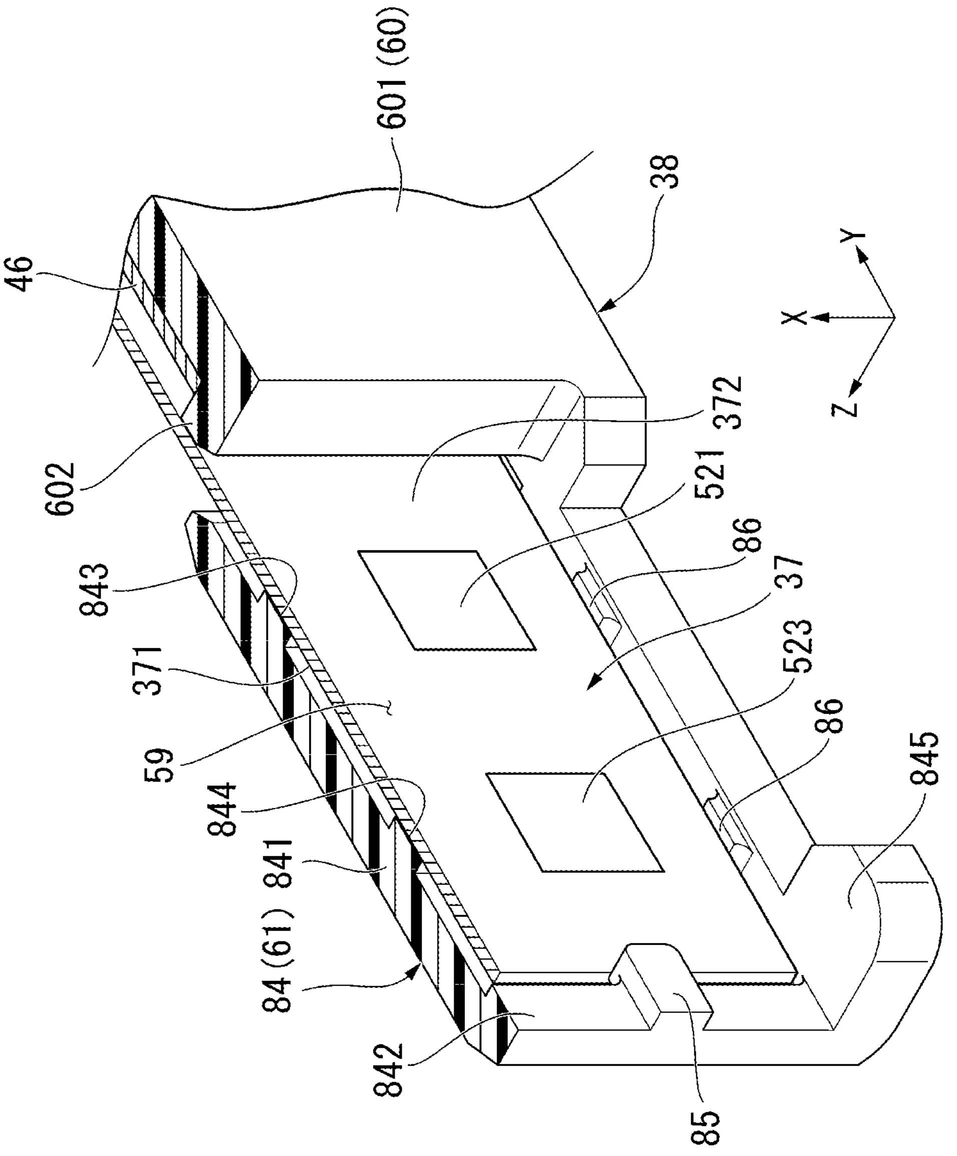
FIG. 23 is a perspective view including a cross section taken along a line XXIII-XXIII in FIG. 22.

As illustrated in FIG. 22, in the state in which the heater 37 is mounted, the −Y side end portion of the heater 37 is in contact with the second rear side contact portion 85. As a result, movement of the heater 37 to the −Y side is restricted. As illustrated in FIG. 23, in the state in which the heater 37 is mounted, the first surface 371 on the −Y side end side of the heater 37 is in contact with each of the third rear side wall portion 843 and the fourth rear side wall portion 844. Therefore, the movement of the heater 37 to the +Z side is restricted by the third rear side wall portion 843 and the fourth rear side wall portion 844. In the state in which the heater 37 is mounted, the second surface 372 on the −Y side end side of the heater 37 is in contact with the second support portion 602 on the rear side. Therefore, movement of the heater 37 to the −Z side is restricted by the second support portion 602 on the rear side. In the state in which the heater 37 is mounted, an end portion of the heater 37 in the lateral direction on the −Y side end side is in contact with the third rear side contact portion 86. Therefore, the movement of the heater 37 in the X direction is restricted by the third rear side contact portion 86.

For example, the third rear side contact portions 86 may be disposed at both end portions of each of the third rear side wall portion 843 and the fourth rear side wall portion 844 in the X direction. As a result, in the state in which the heater 37 is mounted, both end portions of the heater 37 in the lateral direction on the −Y side end side are in contact with the third rear side contact portions 86 on both sides in the X direction. Therefore, the movement of the heater 37 to both sides in the X direction (+X side and −X side) is restricted by the third rear side contact portions 86.

In the state in which the heater 37 is mounted, the power supply units 521, 523, and 526 are located in the opening portions 59. Therefore, the power supply units 521, 523, and 526 are exposed to the −Z side. As illustrated in FIG. 24, in the state in which the heater 37 is mounted, the common contact 526 is exposed to the −Z side on the +Y side end side of the heater 37. In the state in which the heater 37 is mounted, the common contact 526 overlaps with the third front side wall portion 813 as viewed from the Z direction.

As illustrated in FIG. 23, in the state in which the heater 37 is mounted, the central contact 521 and the end portion contact 523 are exposed to the −Z side on the −Y side end side of the heater 37. In the state in which the heater 37 is mounted, the central contact 521 overlaps with the third rear side wall portion 843 as viewed from the Z direction. In the state in which the heater 37 is mounted, the end portion contact 523 overlaps with the fourth rear side wall portion 844 as viewed from the Z direction. Accordingly, the support member 38 provides support directly beneath each of the contacts in the Z direction, minimizing deflection of the heater 37 and associated stresses on the heater 37 caused by the contact forces of the power supply connectors 101 in the Z direction.

As illustrated in FIG. 18, next, the power supply connectors 101 are connected to the power supply units 521, 523, and 526 of the heater 37. Hereinafter, a unit (an assembly) in the state in which the heater 37 is mounted on the support member 38 is referred to as a mounting unit 100. Each of the power supply connectors 101 is formed with an insertion hole 110 (e.g., a slot, a groove, a passage, etc.) that opens in the X direction so as to allow an outer portion of the mounting unit 100 in the Y direction to be inserted therethrough.

Each power supply connector 101 includes a first connector wall portion 111 and a second connector wall portion 112 that face each other across the insertion hole 110. The first connector wall portion 111 is in contact with the +Z side surface of the first contact portion 61 of the mounting unit 100. The second connector wall portion 112 includes terminal portions connected to the power supply units 521, 523, and 526. The terminal portions are biased to the +Z side toward the power supply units 521, 523, and 526 by a biasing member such as a leaf spring.

The power supply connectors 101 are attached to both sides of the mounting unit 100 in the longitudinal direction.

Hereinafter, the power supply connector 101 attached to one side (the front side of the image forming apparatus 1) in the longitudinal direction of the mounting unit 100 is referred to as a front side power supply connector 121. Hereinafter, the power supply connector 101 attached to the other side (the rear side of the image forming apparatus 1) in the longitudinal direction of the mounting unit 100 is referred to as a rear side power supply connector 122.

For example, first, the rear side power supply connector 122 is attached to the −Y side of the mounting unit 100. For example, the rear side power supply connector 122 is moved in a direction of an arrow CA in FIG. 18. As a result, the −Y side end portion of the mounting unit 100 is inserted into the insertion hole 110 of the rear side power supply connector 122. As illustrated in FIG. 9, the first rear side contact portion 84 of the mounting unit 100 has a shape curved toward the +Z side. Therefore, the −Y side end portion of the mounting unit 100 can be smoothly inserted into the insertion hole 110 of the rear side power supply connector 122.

Two terminal portions are provided corresponding to the two power supply units 521 and 523. The terminal portion corresponding to the (one) power supply unit 521 is guided along the third rear side wall portion 843 via the heater 37. The terminal portion corresponding to the (other) power supply unit 523 is guided along the fourth rear side wall portion 844 via the heater 37. Accordingly, the −Y side end portion of the mounting unit 100 can be smoothly inserted into the insertion hole 110 of the rear side power supply connector 122.

In the present embodiment, the pair of convex portions 845 are provided at the end portions of the second rear side wall portion 842 in the X direction. In a state in which the rear side power supply connector 122 is attached, the pair of convex portions 845 may be in contact with the −Y side surface of the rear side power supply connector 122. Accordingly, positional deviation of the rear side power supply connector 122 to the −Y side can be avoided.

Next, the front side power supply connector 121 is attached to the +Y side of the mounting unit 100. For example, the front side power supply connector 121 is moved in a direction of an arrow CB in FIG. 18. As a result, the +Y side end portion of the mounting unit 100 is inserted into the insertion hole 110 of the front side power supply connector 121. The first front side contact portion 81 of the mounting unit 100 has a shape curved toward the +Z side in the same manner as the first rear side contact portion 84. Therefore, the +Y side end portion of the mounting unit 100 can be smoothly inserted into the insertion hole 110 of the front side power supply connector 121.

The front side power supply connector 121 has two terminal portions in the same manner as the rear side power supply connector 122. One terminal portion corresponding to the power supply unit 526 is guided along the third front side wall portion 813 via the heater 37. The other terminal portion is directly guided along the fourth front side wall portion 814. Accordingly, the +Y side end portion of the mounting unit 100 can be smoothly inserted into the insertion hole 110 of the front side power supply connector 121.

In the present embodiment, the second front side wall portion 812 is provided at the +Y side end portion of the first front side wall portion 811. In a state in which the front side power supply connector 121 is attached, the second front side wall portion 812 may be in contact with the +Y side surface of the front side power supply connector 121. Accordingly, positional deviation of the front side power supply connector 121 to the +Y side can be avoided.

Through the above steps, the power supply connectors 101 can be connected to the power supply units 521, 523, and 526 of the heater 37 in the mounting unit 100. For example, the power supply connector 101 may be of a lock type that is locked at a connection position by a lock pin or the like. For example, the power supply connector 101 may have a configuration in which the power supply connector 101 is unlocked by pressing a switch. For example, the power supply connector 101 may have a configuration in which when the power supply connector 101 is unlocked, the pair of connector wall portions 111 and 112 are opened.

As described above, the heating device 30 according to the embodiment includes the tubular body 36, the heater 37, the power supply units 521, 523, and 526, and the support member 38. The tubular body 36 is formed in a tubular shape. The heater 37 is disposed inside the tubular body 36. The heater 37 has the axial direction of the tubular body 36 as the longitudinal direction. The heater 37 is in contact with the inner peripheral surface of the tubular body 36 on the first surface side 371. The heater 37 generates heat by energization. The power supply units 521, 523, and 526 supply power to the heater 37. The opening portions 59 for exposing the power supply units 521, 523, and 526 are formed in the support member 38. The support member 38 has the axial direction as the longitudinal direction. The support member 38 supports the attached heater 37 by being bent relative to the heater 37. The above configuration exhibits the following effects. The heater 37 can be attached to the support member 38 by bending the support member 38 relative to the heater 37. The support member 38 can support the heater 37 attached as described above. Therefore, complication of the support member 38 can be prevented.

When the tubular body 36 slides on the first surface 371 of the heater 37, in order to prevent wear or damage to the first surface 371 of the heater 37, the disposition of the heater 37 may be changed with respect to the tubular body 36. When the disposition of the heater 37 is changed, the disposition of the power supply units 521, 523, and 526 may be changed. Depending on the disposition of the heater 37 and the power supply units 521, 523, and 526, the support member 38 may be complicated. For example, a structure is provided in which the support member 38 is divided into a plurality of members and the divided plurality of members are combined to support the heater 37. However, when the support member 38 is divided into a plurality of members, the number of components increases, and the support member 38 is complicated. On the other hand, according to the embodiment, since the support member 38 is formed of one single member that is continuous in the longitudinal direction of the support member 38, the increase in the number of components can be prevented. Therefore, the complication of the support member 38 due to the increase in the number of components can be prevented.

The amount of deformation of the support member 38 in the direction intersecting the longitudinal direction and the lateral direction in the state in which the heater 37 is attached to the support member 38 is larger than the amount of deformation of the heater 37 in the direction intersecting the longitudinal direction and the lateral direction. The above configuration exhibits the following effects. The heater 37 can be attached to the support member 38 by largely bending the support member 38 with respect to the heater 37. Therefore, excessive deformation of the heater 37 can be avoided when mounting the heater 37. Therefore, cracking, damage, or the like due to the deformation of the heater 37 can be prevented.

The support member 38 includes the support portion main body 60 and the first contact portion 61. In the support portion main body 60, the opening portions 59 are formed on the end portion sides of the support member 38 in the longitudinal direction. The support portion main body 60 is in contact with the second surface 372 side opposite to the first surface 371 side of the heater 37. The first contact portion 61 is disposed via the gap 69 that opens to allow the heater 37 to move in the axial direction with respect to the support portion main body 60. The first contact portion 61 is in contact with the first surface 371 side of the heater 37. The above configuration exhibits the following effects. The support portion main body 60 is in contact with the second surface 372 side of the heater 37, so that the movement of the heater 37 to the second surface 372 side can be restricted. The first contact portion 61 is in contact with the first surface 371 side of the heater 37, so that the movement of the heater 37 to the first surface 371 side can be restricted. Therefore, positional deviations of the heater 37 to the first surface 371 side and the second surface 372 side (Z direction) can be prevented.

The support member 38 further includes the second contact portions 62 disposed with respect to the support portion main body 60 via the opening portions 59. The second contact portions 62 are in contact with the end portions of the heater 37 in the longitudinal direction. The above configuration exhibits the following effects. The second contact portions 62 are in contact with the end portions of the heater 37 in the longitudinal direction, so that the movement of the heater 37 in the longitudinal direction can be restricted. Therefore, positional deviation of the heater 37 in the longitudinal direction (Y direction) can be prevented.

The first contact portions 61 and the second contact portions 62 are disposed on both sides of the support member 38 in the longitudinal direction. The above configuration exhibits the following effects. The first contact portions 61 are in contact with the first surface 371 of the heater 37 on both sides of the support member 38 in the longitudinal direction, so that the movement of the heater 37 to both sides in the longitudinal direction toward the first surface 371 can be restricted. The second contact portions 62 are in contact with the end portions of the heater 37 in the longitudinal direction on both sides of the support member 38 in the longitudinal direction, so that the movement of the heater 37 to both sides in the longitudinal direction can be restricted. Therefore, positional deviation of the heater 37 toward the first surface 371 and positional deviation of the heater 37 in the longitudinal direction can be more effectively prevented.

The power supply units 521, 523, and 526 are disposed on the second surface 372 side opposite to the first surface 371 side of the heater 37, the first surface 371 being in contact with the inner peripheral surface of the tubular body 36. The above configuration exhibits the following effects. The tubular body 36 slides on the first surface 371 side of the heater 37. The power supply units 521, 523, and 526 are disposed on a side (the second surface 372 side) opposite to a side on which the heater 37 slides. Therefore, wear and damage to the power supply units 521, 523, and 526 can be prevented.

The heat equalizing member 46 has the concave portion 461 on the outer surface facing the heater 37. The above configuration exhibits the following effects. Since the concave portion 461 is not in contact with the heater 37, most of heat generated by the heat generating member 51 is transmitted to the tubular body 36 without being transmitted to the heat equalizing member 46. Since the tubular body 36 is efficiently heated, a time before the printing is started can be shortened. A reset time of the image forming apparatus 1 can be reduced or prevented from becoming long.

The concave portion 461 penetrates the heat equalizing member 46 in the Y direction, thereby exhibiting the following effects. The heat generated by the heat generating member 51 is transmitted to the tubular body 36 without being transmitted to the heat equalizing member 46 at any position in the Y direction. Since the tubular body 36 is further efficiently heated, a time before the printing is started can be further shortened.

Next, a modification of the embodiment will be described. In the heating device according to the embodiment, the heater can be attached to the support member by bending the support member with respect to the heater. Alternatively, in the heating device, the heater may be attached to the support member by bending the heater with respect to the support member. For example, the heating device may include a support member to which the heater can be attached by bending the support member relative to the heater. For example, a mode in which the heater and the support member are bent can be changed according to the required specifications.

The amount of deformation of the support member in the direction intersecting the longitudinal direction and the lateral direction in the state in which the heater is attached to the support member according to the embodiment is larger than the amount of deformation of the heater in the direction intersecting the longitudinal direction and the lateral direction. On the other hand, the amount of deformation of the support member in the direction intersecting the longitudinal direction and the lateral direction in the state in which the heater is attached to the support member may be equal to or less than the amount of deformation of the heater in the direction intersecting the longitudinal direction and the lateral direction. For example, modes of the amounts of deformation of the heater and the support member in the state in which the heater is attached to the support member can be changed according to the required specifications.

The support member according to the embodiment includes the support portion main body in which the opening portion is formed on the end portion side in the longitudinal direction of the support member, the support portion main body being in contact with the second surface side opposite to the first surface side of the heater. On the other hand, the support member may not include a support portion main body. For example, the support member may include a contact member that is in contact with the second surface side of the heater, separately from the support portion main body. For example, a configuration mode of the support member can be changed according to the required specifications.

The support member according to the embodiment includes the first contact portion that is disposed via the gap, which opens so as to allow the heater to move in the axial direction with respect to the support portion main body, and is in contact with the first surface side of the heater. However, the support member may not include the first contact portion. For example, the support member may include a contact member that is in contact with the first surface side of the heater, separately from the first contact portion. For example, a configuration mode of the support member can be changed according to the required specifications.

The support member according to the embodiment includes the second contact portion that is disposed via the opening portion with respect to the support portion main body and is in contact with the end portion of the heater in the longitudinal direction. However, the support member may not include the second contact portion. For example, the support member may include a contact member that is in contact with the end portion of the heater in the longitudinal direction, separately from the second contact portion. For example, a configuration mode of the support member can be changed according to the required specifications.

The first contact portions and the second contact portions according to the embodiment are disposed on both sides of the support member in the longitudinal direction. Alternatively, the first contact portions and the second contact portions may not be disposed on both sides of the support member in the longitudinal direction. For example, the first contact portion and the second contact portion may be disposed only on one side of the support member in the longitudinal direction. For example, a disposition mode of the first contact portion and the second contact portion can be changed according to the required specifications.

The power supply units according to the embodiment are disposed on the second surface side opposite to the first surface side of the heater, the first surface side being in contact with the inner peripheral surface of the tubular body. Alternatively, the power supply units may be disposed on the first surface side of the heater that is in contact with the inner peripheral surface of the tubular body. For example, a disposition mode of the power supply units can be changed according to the required specifications.

The heat equalizing member according to the embodiment has the concave portion on the outer surface facing the heater side. Alternatively, the heat equalizing member may not have a concave portion on the outer surface facing the heater side. For example, the heat equalizing member may be formed in a flat plate shape that has the axial direction of the tubular body as a longitudinal direction. For example, a mode of the heat equalizing member can be changed according to the required specifications.

The heater according to the embodiment is disposed inside the portion where the tubular body faces a pressure member so as to face the nip. However, the heater may not be disposed to face the nip. For example, the heater may face a region to be heated that is a part of the tubular body in the circumferential direction. For example, a disposition mode of the heater can be changed according to the required specifications.

In the method for mounting the heater according to the embodiment, first, the −Y side end portion of the heater is obliquely inserted into the gap on the rear side. Alternatively, in the method for mounting the heater, first, the +Y side end portion of the heater may be obliquely inserted into the gap on the front side. For example, a method for mounting the heater can be changed according to the required specifications.

According to at least one of the embodiments described above, the support member can support the attached heater by being bent relative to the heater. Therefore, complication of the support member can be prevented.

While certain embodiments have been described, these embodiments have been presented as examples and are not intended to limit the scope of the disclosure. These embodiments can be implemented in various other forms, and various omissions, substitutions, and changes can be made without departing from the gist of the disclosure. The accompanying claims and their equivalents are intended to cover these embodiments or modifications as would fall within the scope and spirit of the exemplary embodiments described herein.

What is claimed is:

1. A heater assembly, comprising:

a tubular body formed in a tubular shape and having a length that extends longitudinally;

a heater received within the tubular body and being configured to provide thermal energy in response to being electrically energized, the heater including:

a first surface side extending laterally and longitudinally along an inner peripheral surface of the tubular body; and an electrical contact through which electrical energy is supplied to the heater; and a support member coupled to the heater and extending longitudinally, the support member including:

a support portion main body having an end portion side in a longitudinal direction that at least partially defines an opening that exposes the electrical contact, the support portion main body being in contact with a second surface side of the heater that is opposite the first surface side of the heater; and a first contact portion coupled to the support portion main body and in contact with the first surface side of the heater, a gap being defined between the support portion main body and the first contact portion, the gap receiving the heater, and the gap extending longitudinally to permit the heater to move in the longitudinal direction with respect to the support portion main body, and the support member being configured to bend to facilitate coupling the heater to the support member.

2. The heater assembly of claim 1, wherein the first surface side of the heater is in contact with the inner peripheral surface of the tubular body.

3. The heater assembly of claim 1, wherein:

an orthogonal direction is defined perpendicular to a lateral direction and the longitudinal direction; and the support member is configured to bend such that a longitudinal end portion of the support member deflects in the orthogonal direction to facilitate coupling the heater to the support member.

4. The heater assembly of claim 1, wherein:

an orthogonal direction is defined perpendicular to a lateral direction and the longitudinal direction; and in a state in which the heater is coupled to the support member, an amount of deformation of the support member in the orthogonal direction is larger than an amount of deformation of the heater in the orthogonal direction.

5. The heater assembly of claim 1, wherein the support member further includes:

a second contact portion coupled to the first contact portion and positioned such that the opening extends between the support portion main body and the second contact portion, the second contact portion being in contact with a longitudinal end portion of the heater.

6. The heater assembly of claim 5, wherein the second contact portion engages the longitudinal end portion of the heater to limit longitudinal movement of the heater.

7. The heater assembly of claim 5, wherein the support portion main body, the first contact portion, and the second contact portion are formed as a single, continuous piece.

8. The heater assembly of claim 5, wherein:

the gap is a first gap; and the support member further includes:

a third contact portion coupled to the support portion main body and in contact with the first surface side of the heater, a second gap being defined between the support portion main body and the third contact portion, the second gap receiving the heater, and the second gap extending longitudinally to permit the heater to move in the longitudinal direction with respect to the support portion main body.

9. The heater assembly of claim 8, wherein:

the electrical contact is a first electrical contact, the end portion side is a first end portion side, and the opening is a first opening;

the heater further includes a second electrical contact; and the support portion main body has a second end portion side opposite the first end portion side, the second end portion side at least partially defining a second opening that exposes the second electrical contact.

10. The heater assembly of claim 9, wherein:

the longitudinal end portion of the heater is a first longitudinal end portion of the heater;

the heater has a second longitudinal end portion opposite the first longitudinal end portion of the heater; and the support member further includes:

a fourth contact portion coupled to the third contact portion and positioned such that the second opening extends between the support portion main body and the fourth contact portion, the fourth contact portion being positioned to contact the second longitudinal end portion of the heater.

11. The heater assembly of claim 10, wherein:

the second contact portion is configured to engage the first longitudinal end portion of the heater to limit longitudinal movement of the heater in a first direction; and the fourth contact portion is configured to engage the second longitudinal end portion of the heater to limit longitudinal movement of the heater in a second direction opposite the first direction.

12. The heater assembly of claim 5, wherein the support member further includes:

a pair of third contact portions each coupled to the first contact portion and positioned to engage the heater to limit lateral movement of the heater.

13. The heater assembly of claim 1, further comprising a power supply connector that extends within the opening and engages the electrical contact, the power supply connector defining a groove that receives the first contact portion and the heater when the power supply connector engages the electrical contact.

14. The heater assembly of claim 13, wherein the end portion side of the support portion main body is positioned to engage the power supply connector when the power supply connector receives the first contact portion and the heater.

15. The heater assembly of claim 1, further comprising a heat equalizing member in contact with the heater, the heat equalizing member including a concave portion facing the heater and extending longitudinally along the heat equalizing member.

16. The heater assembly of claim 15, wherein:

the heat equalizing member is in contact with the second surface side of the heater that is opposite the first surface side of the heater; and the heat equalizing member is coupled to the support member and extends between the heater and the support member.

* * * * *